(12) United States Patent
Frohliger

(10) Patent No.: US 8,887,076 B2
(45) Date of Patent: Nov. 11, 2014

(54) SOFTWARE USER INTERFACE ALLOWING LOGICAL EXPRESSION TO BE EXPRESSED AS A FLOWCHART

(75) Inventor: Matthew Scott Frohliger, Green Bay, WI (US)

(73) Assignee: Aver Informatics Inc., De Pere, WI (US)

( * ) Notice: Subject to any disclaimer, the term of this patent is extended or adjusted under 35 U.S.C. 154(b) by 144 days.

(21) Appl. No.: 13/286,850

(22) Filed: Nov. 1, 2011

(65) Prior Publication Data

US 2013/0111375 A1    May 2, 2013

(51) Int. Cl.
G06F 3/048    (2013.01)
G06F 17/30    (2006.01)

(52) U.S. Cl.
CPC .......... *G06F 17/30389* (2013.01); *G06F 3/048* (2013.01)
USPC ........... 715/764; 715/763; 715/780; 715/769; 715/810; 707/769; 707/776; 707/758; 707/754

(58) Field of Classification Search
CPC .............. G06F 17/30; G06F 17/30286; G06F 17/30386; G06F 17/30389; G06F 17/30392; G06F 17/30395; G06F 17/30398; G06F 17/30401; G06F 17/30424; G06F 17/30554
USPC .......... 715/763, 780, 764, 769, 810; 707/769, 707/776, 758, 754
See application file for complete search history.

(56) References Cited

U.S. PATENT DOCUMENTS

| | | | | |
|---|---|---|---|---|
| 5,175,814 A | * | 12/1992 | Anick et al. .................. | 715/835 |
| 5,421,008 A | * | 5/1995 | Banning et al. ........................ | 1/1 |
| 5,428,737 A | * | 6/1995 | Li et al. .................................. | 1/1 |
| 5,428,776 A | * | 6/1995 | Rothfield ............................... | 1/1 |
| 5,555,367 A | * | 9/1996 | Premerlani et al. ................... | 1/1 |
| 5,574,908 A | * | 11/1996 | Harding et al. ........................ | 1/1 |
| 5,619,688 A | * | 4/1997 | Bosworth et al. ..................... | 1/1 |
| 5,696,916 A | * | 12/1997 | Yamazaki et al. ............. | 715/853 |
| 5,701,456 A | * | 12/1997 | Jacopi et al. .......................... | 1/1 |
| 5,721,901 A | * | 2/1998 | Banning et al. ....................... | 1/1 |
| 5,842,203 A | * | 11/1998 | D'Elena et al. ....................... | 1/1 |
| 5,909,678 A | * | 6/1999 | Bergman et al. ...................... | 1/1 |
| 6,111,574 A | * | 8/2000 | Meek ............................. | 715/835 |
| 6,208,985 B1 | * | 3/2001 | Krehel .......................... | 707/767 |
| 6,240,411 B1 | * | 5/2001 | Thearling .............................. | 1/1 |
| 6,326,962 B1 | * | 12/2001 | Szabo .......................... | 715/762 |
| 6,353,452 B1 | * | 3/2002 | Hamada et al. ............... | 715/825 |
| 6,470,335 B1 | | 10/2002 | Marusak | |
| 6,640,221 B1 | * | 10/2003 | Levine et al. ......................... | 1/1 |

(Continued)

*Primary Examiner* — Weilun Lo
*Assistant Examiner* — Rashedul Hassan
(74) *Attorney, Agent, or Firm* — Michael Best & Friedrich LLP

(57) ABSTRACT

Methods and systems for providing a user interface for building a graphical flowchart that represents a database query. One method includes presenting a plurality of flowchart step types, wherein each of the flowchart step types is associated with a different logical expression format. The method also includes receiving a selection of one of the plurality of flowchart step types, presenting at least one expression option for the logical expression format of the selected flowchart step type, and receiving at least one input for the expression option. The method further includes generating a graphical flowchart step associated with a logical expression, wherein the logical expression is based on the at least one input and the logical expression format of the selected flowchart step type. The method also includes displaying the graphical flowchart step and automatically generating a database query corresponding to the logical expression associated with the displayed graphical flowchart step.

23 Claims, 18 Drawing Sheets

(56) References Cited

U.S. PATENT DOCUMENTS

| | | | |
|---|---|---|---|
| 6,658,404 B1* | 12/2003 | Cecchini | 707/758 |
| 6,785,668 B1* | 8/2004 | Polo et al. | 707/771 |
| 6,925,608 B1* | 8/2005 | Neale et al. | 715/763 |
| 6,947,928 B2* | 9/2005 | Dettinger et al. | 1/1 |
| 7,366,723 B2* | 4/2008 | Shaburov | 1/1 |
| 7,370,040 B1* | 5/2008 | Kruy et al. | 1/1 |
| 7,383,513 B2* | 6/2008 | Goldberg et al. | 715/763 |
| 7,610,308 B1 | 10/2009 | Chiu | |
| 7,668,858 B2* | 2/2010 | Lowe et al. | 707/717 |
| 8,312,038 B2* | 11/2012 | Ceballos et al. | 707/769 |
| 8,312,382 B2* | 11/2012 | Gilboa et al. | 715/763 |
| 2002/0169768 A1* | 11/2002 | Lowe et al. | 707/4 |
| 2003/0163455 A1* | 8/2003 | Dettinger et al. | 707/3 |
| 2005/0004911 A1* | 1/2005 | Goldberg et al. | 707/7 |
| 2005/0192953 A1* | 9/2005 | Neale et al. | 707/4 |
| 2007/0061742 A1* | 3/2007 | Brooks et al. | 715/763 |
| 2007/0156740 A1* | 7/2007 | Leland et al. | 707/102 |
| 2007/0233655 A1* | 10/2007 | Engels | 707/3 |
| 2008/0184140 A1* | 7/2008 | Koerner | 715/762 |
| 2009/0019022 A1 | 1/2009 | Schallert et al. | |
| 2009/0024940 A1 | 1/2009 | Zeringue et al. | |
| 2009/0094217 A1* | 4/2009 | Dettinger et al. | 707/4 |
| 2009/0287685 A1* | 11/2009 | Charnock et al. | 707/5 |
| 2010/0161646 A1* | 6/2010 | Ceballos et al. | 707/769 |
| 2010/0162210 A1* | 6/2010 | Briden et al. | 717/113 |

* cited by examiner

SOFTWARE USER INTERFACE ALLOWING LOGICAL EXPRESSION TO BE EXPRESSED AS A FLOWCHART

FIELD OF THE INVENTION

Embodiments of the invention relate to systems and methods for allowing a user without technical knowledge in data storage and retrieval to create a database query graphically in the form of a flowchart.

SUMMARY

Many organizations want to improve their data mining abilities, either by allowing less technical staff to access data directly or by improving the development time needed for performing data extracts created by technical staff. However, many existing data extraction applications force the user to directly create a complete logical expression using Boolean or other mathematical operations (e.g., "Condition 1 OR Condition 2 AND Condition 3"). These requirements often make creating the expression, and creating the expression correctly, difficult. These requirements also require the user to understand an order of operations and manually override the order of operations as necessary, which represents another level of complexity and possibility for errors. All of these requirements typically reduce the functionality of the data mining application and require the user to have a high level of technical knowledge.

Therefore, embodiments of the invention allow individuals without technical knowledge in data storage and retrieval to express complex data queries intuitively. This allows users to define, implement, verify, and use complicated rules for data retrieval without requiring specialized training.

For example, embodiments of the invention provide a software-based user interface that allows a user to define complex logic rules graphically in the form of a flowchart. In particular, a flowchart graphically represents a process or method and includes a structure of process elements. Each process element of the flowchart describes a step of the process, and the steps are connected by input and output connections that define a sequence or order of the steps. Using a similar structure, embodiments of the invention allow a user to describe logical expressions as steps of a graphical flowchart. Each step of the flowchart includes a single logical expression, and the steps are connected with "pass" and "fail" connections. Each step can represent a simple logical expression, such as "Bill Type='488,'" or a complex logical expression, such as "The drug charges for this claim do not exceed 25% of the total claim charges." Each step can be connected to one or more other steps by a "pass" connection or a "fail" connection. The type of connection connecting two steps defines the relationship between the logical expressions associated with the steps. For example, connecting the two steps described above with a "pass" connection creates the logical equivalent of "Bill Type='488' AND The drug charges for this claim do not exceed 25% of the total claim charges." Similarly, connecting the two steps with a "fail" connection creates the logical equivalent of "NOT (Bill Type='488') AND The drug charges for this claim do not exceed 25% of the total claim charges."

After the user completes the flowchart representing the logical expressions, the software automatically converts the graphical flowchart to a data retrieval or query statement, such as a structured query language ("SQL") statement. The query can then be executed and the user interface (or a separate software application) can present the results of the query to the user. Therefore, using a combination of graphical steps and "pass" and "fail" connections between the steps, a user is able to describe complex logical expressions without understanding the sometimes confusing nature of the expressions. In particular, embodiments of the invention abstract away the complex relationship within a logical expression. For example, there is no need for a user to understand the Boolean operations "AND," "OR," or "NOT" or an order of operations within logical expressions and instead can express logical expressions graphically in a way that is more intuitive.

Accordingly, embodiments of the invention provide a computer-implemented method for providing a user with a user interface for building a flowchart that graphically represents a database query. The method includes presenting to the user, within the user interface, a plurality of flowchart step types, wherein each of the plurality of flowchart step types is associated with a different logical expression format. The method also includes receiving, at a processor, a selection of one of the plurality of flowchart step types from the user; presenting to the user at least one expression option for the logical expression format of the selected flowchart step type; and receiving, at the processor, at least one input for the at least one expression option from the user. The method further includes generating, at the processor, a graphical flowchart step associated with a logical expression, wherein the logical expression is based on the at least one input and the logical expression format of the selected flowchart step type. The method also includes displaying to the user the graphical flowchart step within the user interface and automatically generating, at the processor, a database query corresponding to the logical expression associated with the displayed graphical flowchart step.

Embodiments of the invention also provide a system for providing a user with a user interface for building a flowchart that graphically represents a database query. The system includes computer-readable media storing a logic application and a processor configured to retrieve and execute the logic application. The processor executes the logic application to present the user with a plurality of flowchart step types, wherein each of the plurality of flowchart step types is associated with a different logical expression format; to receive a selection of one of the plurality of flowchart step types from the user; to present the user with at least one expression option for the logical expression format of the selected flowchart step type; to receive at least one input for the at least one expression option from the user; to generate a graphical flowchart step associated with a logical expression based on the at least one input; to display the graphical flowchart step to the user; and to automatically generate a database query corresponding to the logical expression associated with the displayed graphical flowchart step.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

Figure 1:
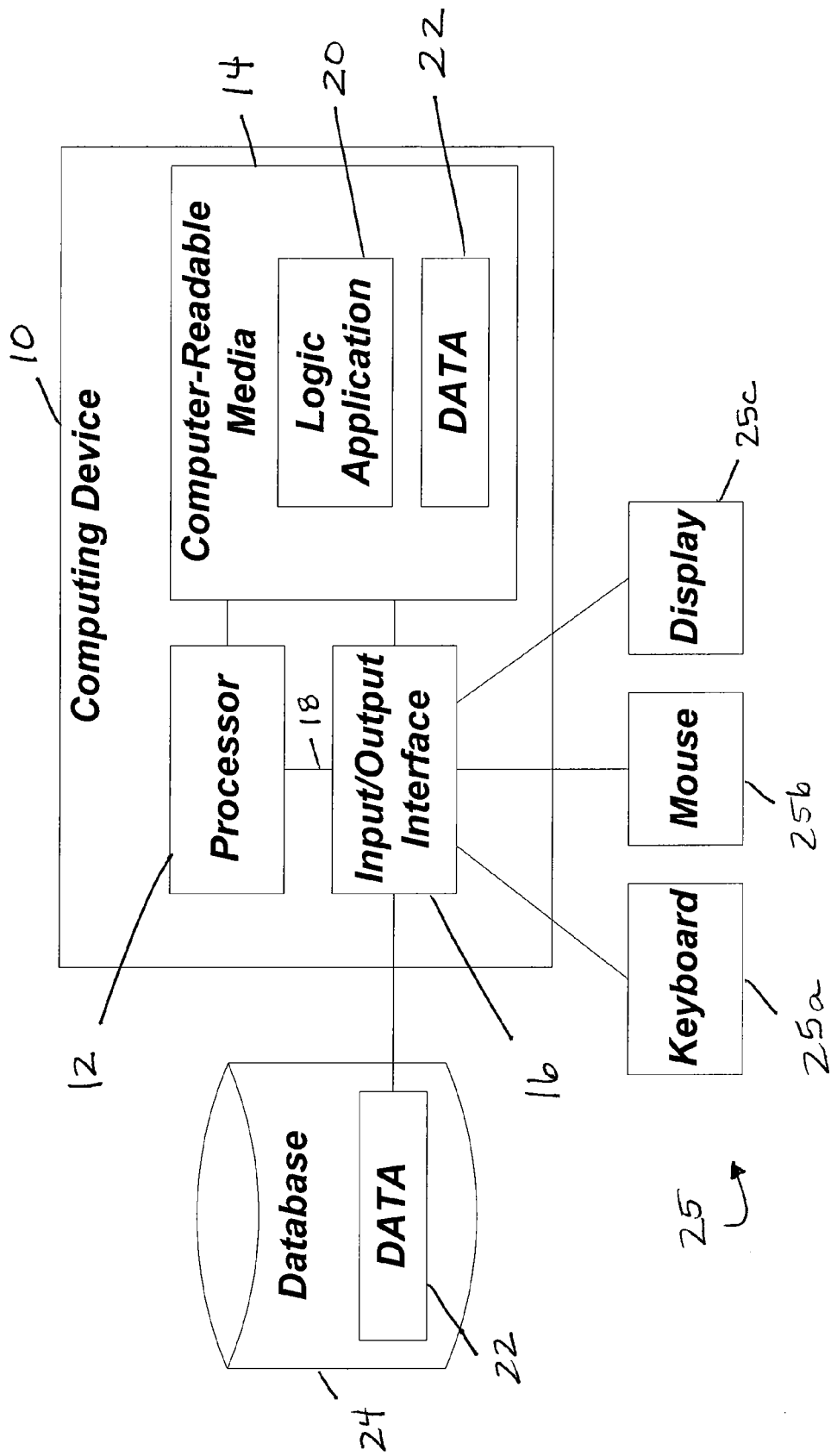
FIG. 1 schematically illustrates a system for providing a user interface that allows a user to express logical expressions as a graphical flowchart.

FIG. 1 schematically illustrates a system for providing a user interface that allows a user to express logical expressions as a graphical flowchart. The system includes a computing device 10 that includes a processor 12, computer-readable media 14, and an input/output interface 16. The processor 12, computer-readable media 14, and input/output interface 16 are connected by one or more connections 18, such as a system bus. It should be understood that in some embodiments the computing device 10 includes multiple processors 12, computer-readable media modules 14, and/or input/output interfaces 16.

The processor 12 retrieves and executes instructions stored in the computer-readable media 14. The processor 12 can also store data to the computer-readable media 14. The computer-readable media 14 can include non-transitory computer readable medium and can include volatile memory, non-volatile memory, or a combination thereof. The instructions stored in the computer-readable media 14 can include various components or modules configured to perform particular functionality when executed by the processor 12. For example, as illustrated in FIG. 1, the computer-readable media 14 can store a logic application 20. As described in more detail below, the logic application 20 provides a user interface that allows a user without technical knowledge in data storage and retrieval to create a database query graphically in the form of a flowchart.

The computer-readable media 14 can also store data 22. The logic application 20 can be configured to guide a user through creating a query for the data 22. In some embodiments, as shown in FIG. 1, the data 22, or a portion thereof, can be stored in a database 24 located external to the computing device 10. The computing device 10 can connect to the database 24 through the input/output interface 16 over one or more wired or wireless connections or networks.

The input/output interface 16 receives information from outside the computing device 10 and outputs information outside the computing device 10. For example, the input/output interface 16 can include a network interface, such as an Ethernet card or a wireless network card, that allows the computing device 10 to send and receive information over a network, such as a local area network or the Internet. In some embodiments, the input/output interface 16 also includes drivers configured to receive and send data to and from various peripheral devices 25, such as a keyboard 25a, a mouse 25b, and a display 25c. A user can use the peripheral devices 25 to view the user interface provided by the logic application 20 and provide input in response to the interface (e.g., click on icons or graphics, click on selection mechanisms, such as buttons or drown-down menus, and enter data). The input/output interface 16 can also store data received from outside the computing device 10 to the computer-readable media 14 and, similarly, can retrieve data from the computer-readable media 14 to output outside the computing device 10.

Figure 2:
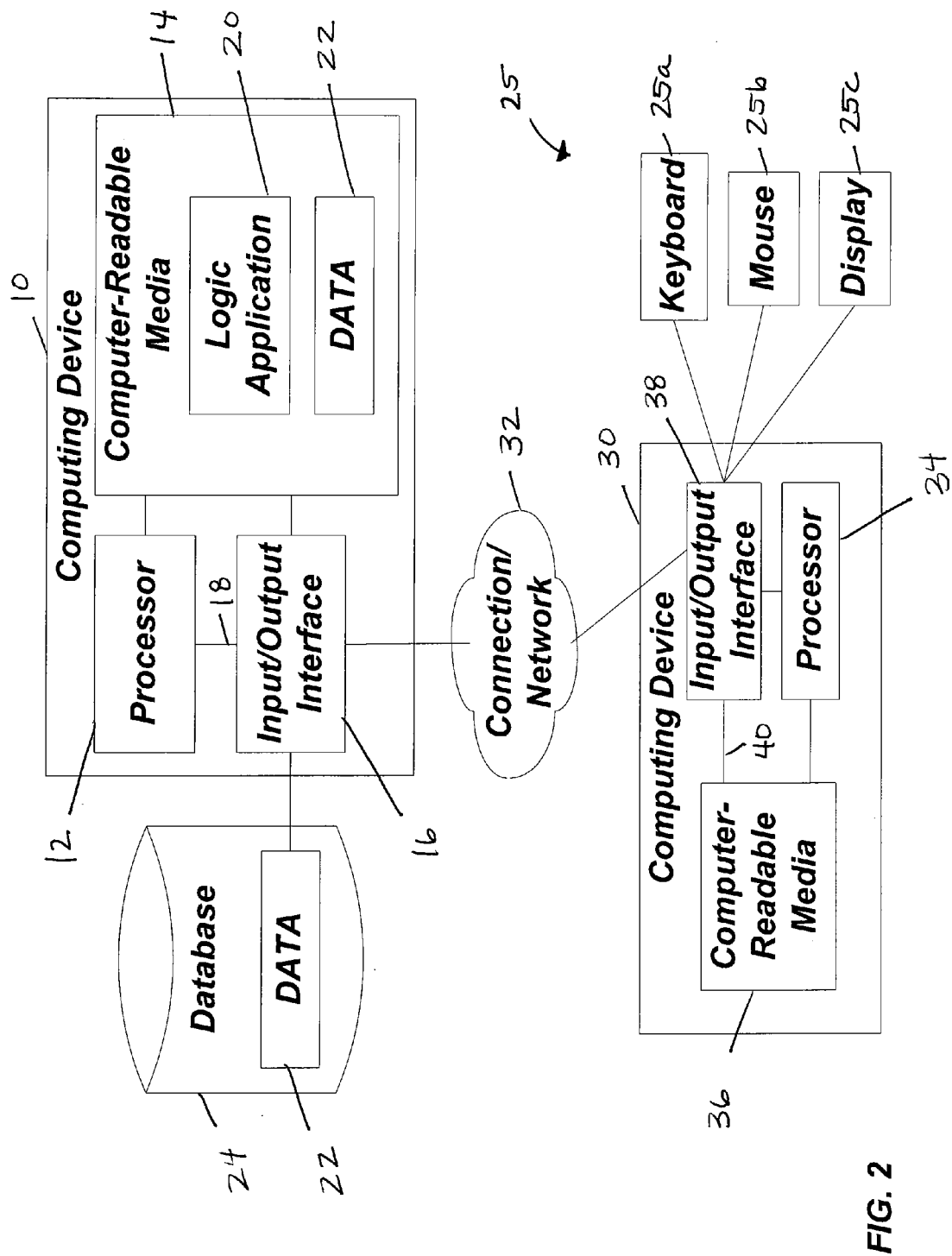
FIG. 2 schematically illustrates a system for providing a user interface through a hosted environment that allows a user to express logical expressions as a graphical flowchart.

It should be understood that in some embodiments the computing device 10 can represent a workstation or personal computer operated by a user to store and execute the logic application 20. However, in other embodiments, the computing device 10 can represent a server that hosts the logic application 20. For example, FIG. 2 illustrates a system for hosting the logic application 20. As shown in FIG. 2, the computing device 10 can represent a server that includes the processor 12, the computer-readable media 14, and the input/output interface 16 connected by the connections 18. The computer-readable media 14 can store the logic application 20 and the data 22 and/or can access the data 22 stored in an external database 24. However, as shown in FIG. 2, a user can operate a second computing device 30 and can access and use the logic application 20 through one or more connections or networks 32, such as the Internet. In particular, as shown in FIG. 2, the second computing device 30 can represent a workstation or personal computer that includes a processor 34, computer-readable media 36, and an input/output interface 38 that are connected by connections 40, such as a system bus.

The processor 34, computer-readable media 36, and input/output interface 38 can operate similar to the processor 12, computer-readable media 14, and input/output interface 16 of the computing device 10, and, the second computing device 30 can also interact with one or more peripheral devices 25, such as a keyboard 25a, a mouse 25b, and a display 25c. However, the second computing device 30 uses the logic application 20 stored by the computing device 10 as a network-based tool or application. Therefore, a user can access the logic application 20 on the second computing device 30 through the connection or network 32. Accordingly, in some embodiments, a user is not required to have the logic application 20 permanently installed on their workstation or personal computer. For example, in some embodiments, the user accesses the logic application 20 using a browser application, such as Internet Explorer® or Firefox®. The browser application can be stored in the computer-readable medium 36 included in the second computing device 30 and can be executed by the processor 34 to connect to the computing device 10 over the Internet. Also, in some embodiments, the computer-readable media 36 stores the data 22, or a portion thereof, and the logic application 20 executed by the computing device 10 can be configured access and retrieve data from the computer-readable medium 36 over the connection or network 32.

Figure 3:
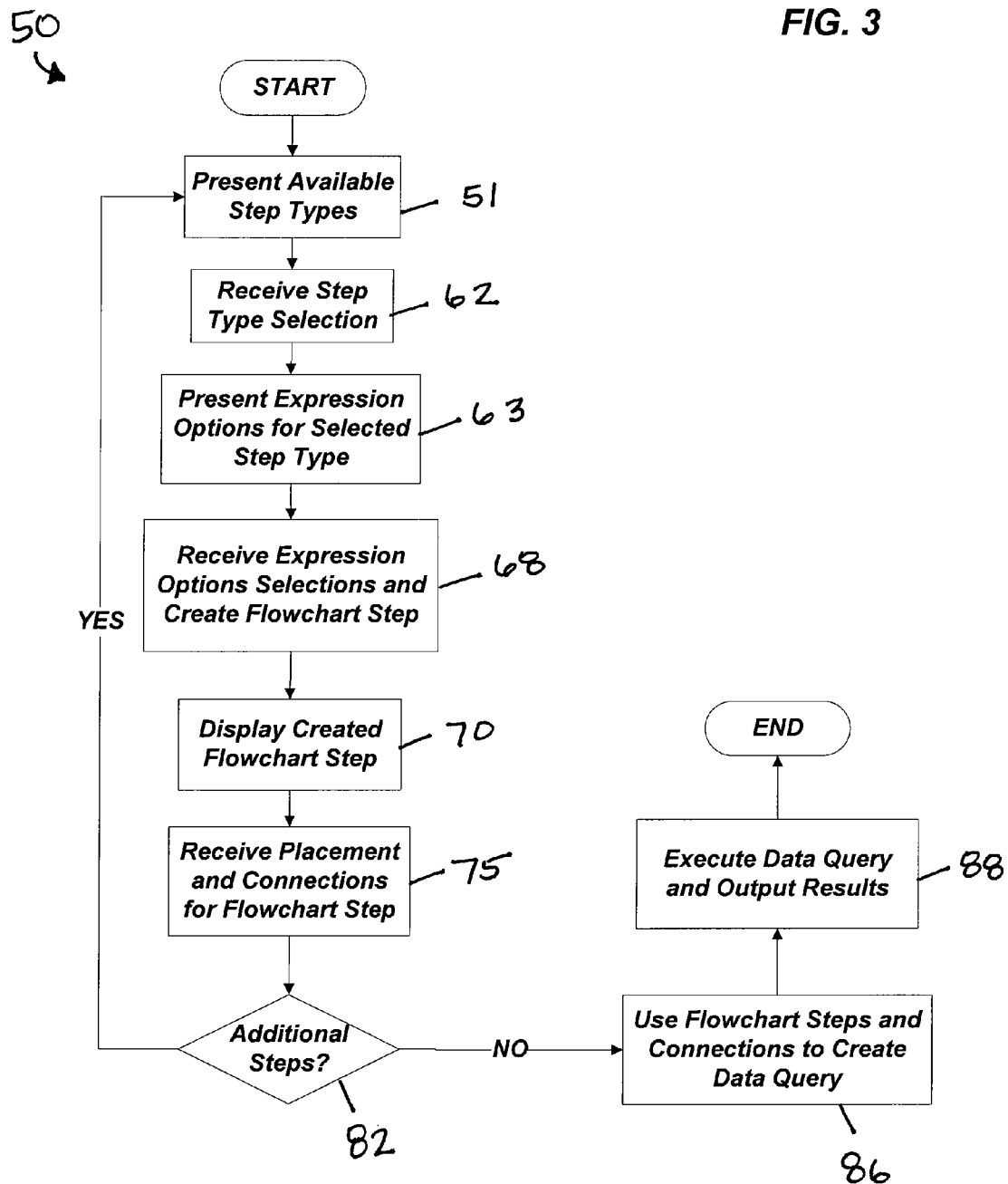
FIG. 3 is a flowchart illustrating a method performed by a logic application to allow a user to create a database query as a graphical flowchart.
Figure 4:
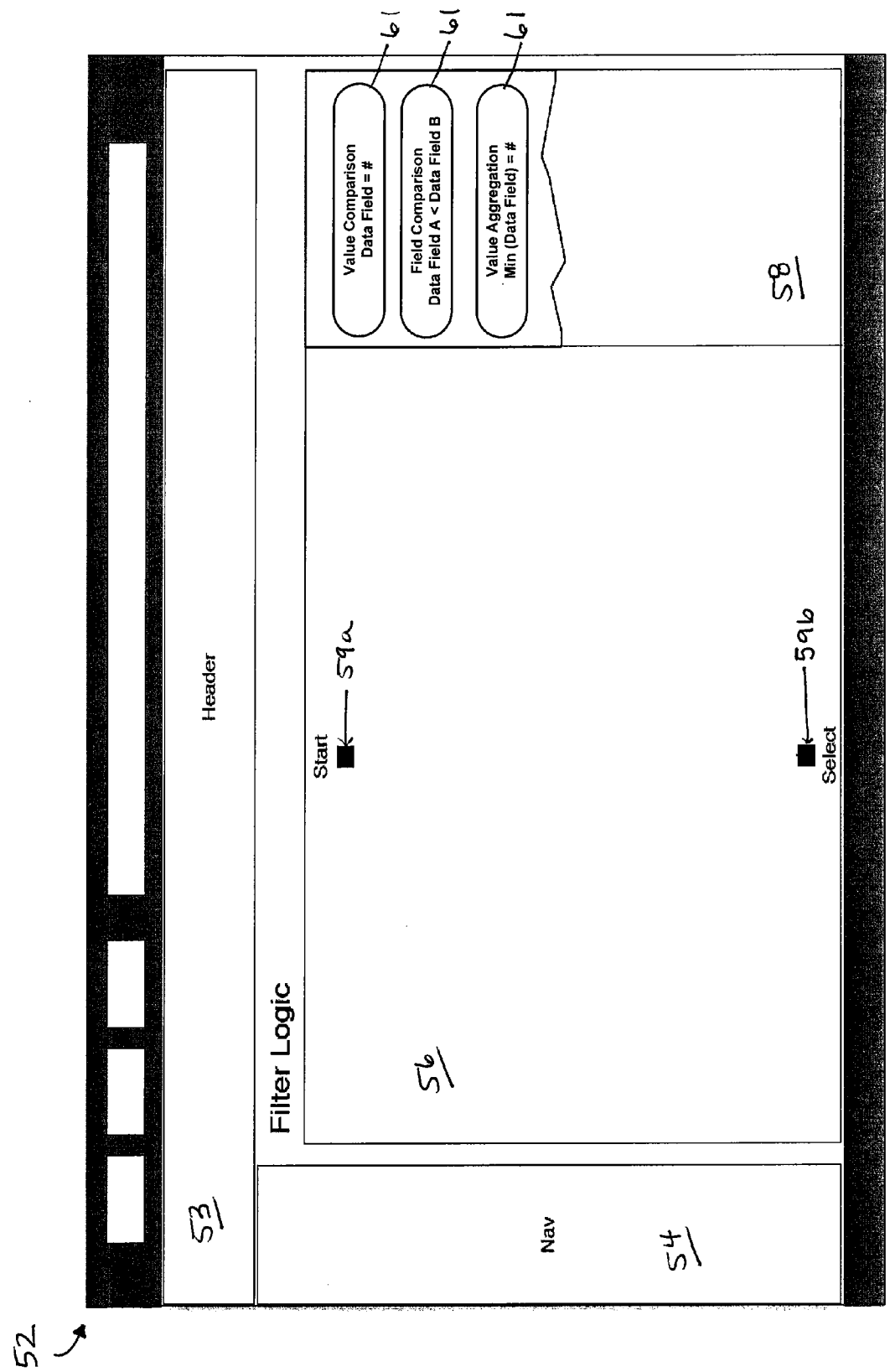
FIGS. 4-18 illustrate pages of the user interface provided by the logic application.

FIG. 3 is a flowchart illustrating a method 50 performed by the logic application 20 to provide a user interface that allows a user without technical knowledge in data storage and retrieval to create a database query graphically in the form of a flowchart. As shown in FIG. 3, the method 50 starts with the logic application 20 displaying step type options to a user (at 51). For example, FIG. 4 illustrates a page 52 of the user interface provided by the logic application 20. The page 52 includes a header section 53, a navigation section 54, a display section 56, and an options section 58. The header section 53 can provide general information about the application 20, such as logos, titles, instructions, etc. The header section 53 can also include selections mechanisms, such as buttons or drop-down menus, for performing basic functions with the application 20 such as starting a new flowchart, saving a current flowchart, opening an existing flowchart, closing an opened flowchart, executing a flowchart to perform a database query, or closing or exiting the logic application 20. The navigation section 54 can include links that allow the user to access various parts or functionality of the application 20. For example, the navigation section 54 can include links to previously created flowcharts or to information about the data 22 (e.g., field names, table names, data types, etc.).

Figure 5:
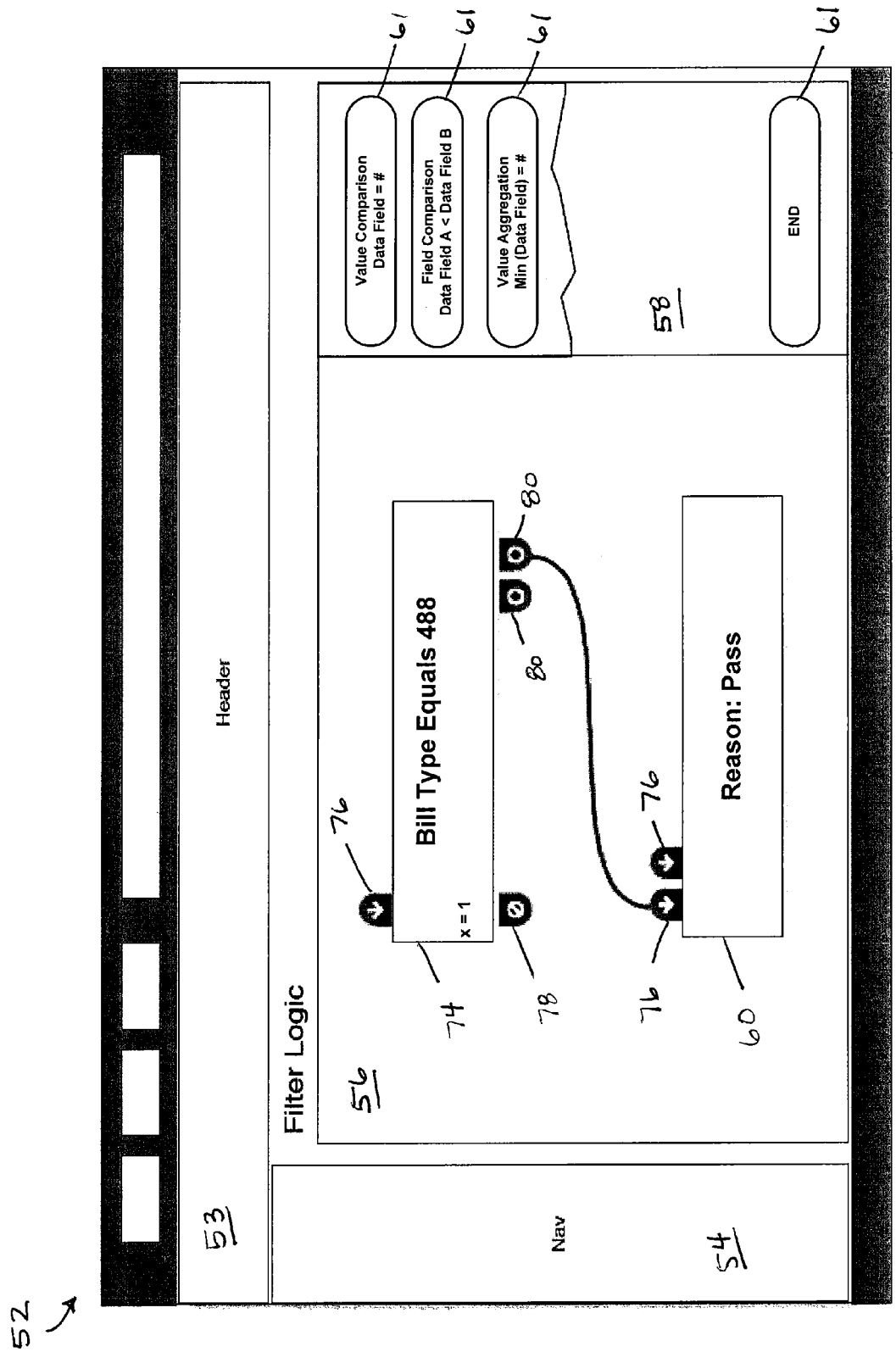

The display section 56 displays the current flowchart being built by the user. As shown in FIG. 4, the display section 56 can include one or more default steps or nodes 59, such as a start node 59a and an end or select node 59b. These nodes can be automatically displayed in the display section 56 each time the user starts a new flowchart, and the user may be restricted from deleting them or changing their positions. Alternatively, in some embodiments, the display section 56 does not include a default start node 59a or a default end node 59b. For example, FIG. 5 illustrates an alternative version of the page 52 where the display section 56 does not include default nodes 59. Rather, as shown in FIG. 5, the flowchart displayed in the display section 56 starts with a first step of the flowchart. In these embodiments, the logic application 20 can be configured to treat any step of a flowchart that does not have an input as a start of the flowchart.

Similarly, as shown in FIG. 5, the display section 56 does not include a default end node 59b. Rather, the flowchart displayed in FIG. 5 includes a user-placed end step 60. As described in more detail below, the user places an end step 60 in the flowchart to indicate that they have completed a path of the flowchart. In some embodiments, a flowchart can include multiple end steps 60. Furthermore, in some embodiments, the flowchart created by the user may not include any end steps 60. In these embodiments, the logic application 20 can be configured to treat any step of a flowchart that does not have any outputs as an end of a path for the flowchart.

The option section 58 displays various options to the user depending on the user's current state in creating a flowchart. For example, in FIG. 4, the user is ready to add a new flowchart or filter step, so the page 52 displays step type options 61 in the options section 58. The user can select one of the step type options 61 to create a flowchart step with a pre-defined logical expression format. For example, the step type options 61 can include a value-comparison type, a field-comparison type, a sub-filter type, an aggregator-value-comparison type, an aggregator-field-comparison type, and a related record type. The value comparison type includes a logical expression format that compares a particular data field included in the data 22 to a user-entered value. The field-comparison type compares a data field included in the data 22 to another data field included in the data 22. The sub-filter type inserts the logic from another flowchart created with the logic application 20. The aggregator-value-comparison type compares an aggregation (e.g., min, max, sum, or average) of a data field included in the data 22 to a user-entered value. The aggregator-field-comparison type compares an aggregation (e.g., min, max, sum, or average) of a data field included in the data 22 to another data field included in the data 22. The related-record type checks for the existence of related data stored in the data 22. For example, if the data 22 stores records tracking service performed by technicians, the user can use the related-record type to build a logical expression that finds a record that includes a date of a service for a particular technician that is greater than another technician's last date of service. The different step types presented by the logic application 20 make it easier for the user to define a logical expression. For example, as described below in more detail, the inputs and selection mechanisms presented to a user for defining a logical expression are tailored to the step type selected by the user. Therefore, the user is guided through the creation of the logical expression based on the type of logical expression the user is attempting to create.

In addition to the step types described above, the logic application 20 can be configured to provide an end step type. For example, as described above with respect to FIG. 5, the user can place an end step 60 to mark the end of a path for a flowchart. To place such an end step 60, the options section 58 can list one or more types of end steps 60 as a step type option 61 (see FIG. 5). Although an end step 60 may not be associated with a logical expression, the user interface may prompt the user for a description for the end step 60. For example, as displayed in FIG. 5, the end step 60 is associated with a description or reason "Pass," which indicates to the user that the end step 60 is the end of the path through the flowchart that is defined by the "pass" connections.

Figure 6:
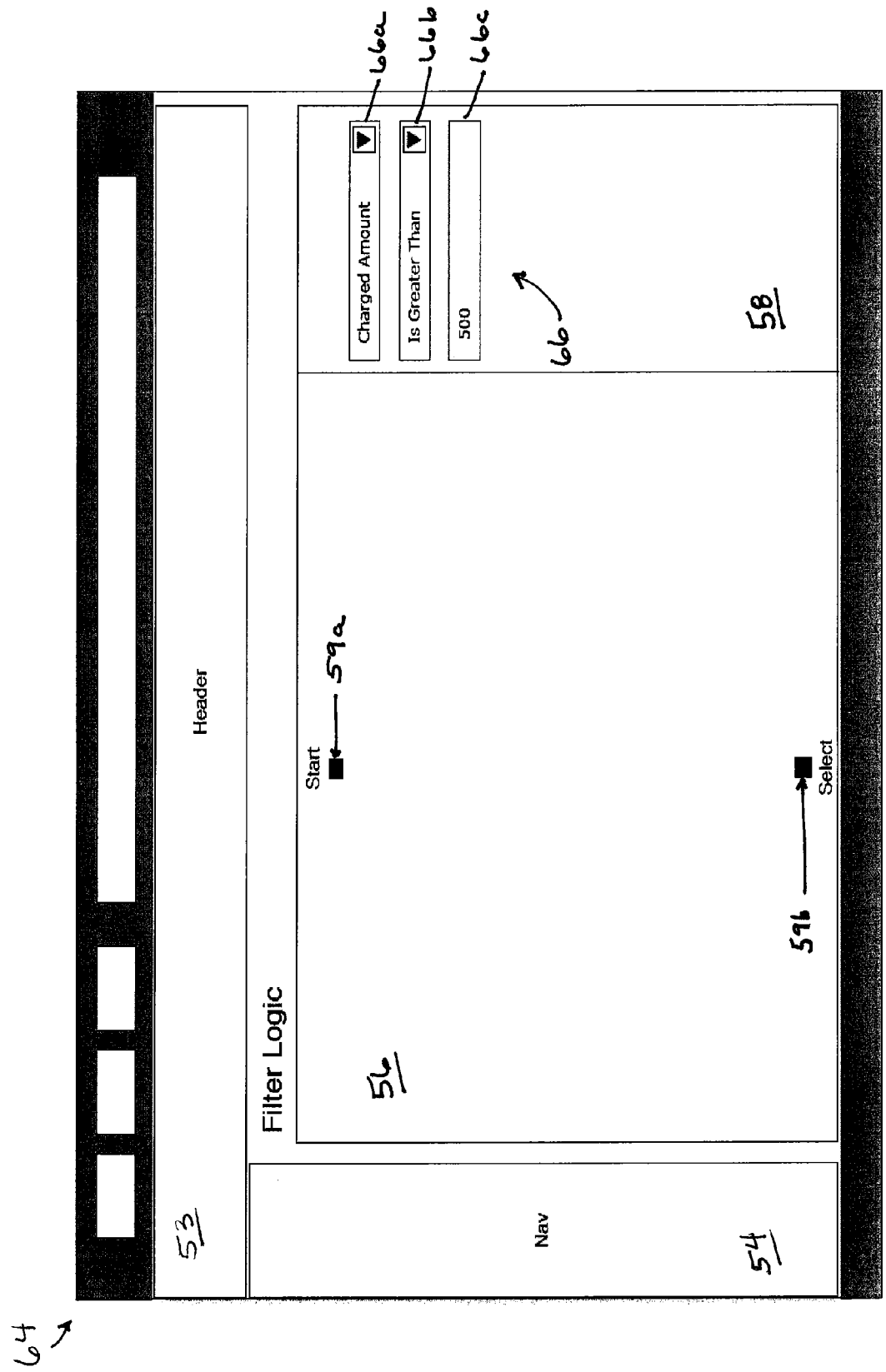

Returning to FIG. 3, after the logic application 20 displays the step type options 61 (at 51), the logic application 20 receives a step type selection from the user (at 62). The user can select a step type by clicking on a graphic associated with the desired step type option 61 or by dragging the graphic into the display section 56. After the user has selected the step type, the logic application 20 can replace the options section 58 with further options for creating a step based on the format of the logical expression associated with the selected step type (at 63). For example, FIG. 6 illustrates a page 64 of the user interface provided by the logic application 20. The options section 58 illustrated in page 64 includes expression options 66 for the selected step type. In particular, the expression options 66 illustrated in page 64 are displayed when the user selects the value-comparison step type. As shown in FIG. 6, the expression options 66 include a data-field selection mechanism 66a, a comparison selection mechanism 66b, and a user-entered-value selection mechanism 66c.

The user uses the data-field selection mechanism 66a to select a particular data field stored in the data 22. In some embodiments, the data field selection mechanism 66a includes an input box that allows the user to manually type in a data field name. In other embodiments, the logic application 20 is preprogrammed with the data fields available in the data 22. In still other embodiments, the logic application 20 is configured to receive parameters of the data 22 during a configuration process to configure the logic application 20 to interact with the data 22. For example, the parameters can include the names of the tables and data fields included in the data 22. The parameters can also include the data type associated with each data field and the relationships between the tables and/or data fields. The logic application 20 can use the parameters to generate a drop-down menu for the data-field selection mechanism 66a that lists available data fields stored in the data 22. Therefore, using the parameters, the logic application 20 can be used with different sets of data without requiring that the application 20 be pre-programmed to interact with particular data. Similarly, if the data 22 is updated or modified, the logic application 20 can be provided with new parameters, which allows the logic application 20 to be used with the updated data without requiring re-programming of the application 20.

In addition, as shown in FIG. 6, in some embodiments the logic application 20 is configured (e.g., through the parameters) to associate a natural language description with each data field and the logic application 20 lists these descriptions in the data-field selection mechanism 66a. Accordingly, the user can select the data field without knowing the exact name of the data field stored in the data 22.

After the user selects a data field using the data-field selection mechanism 66a, the user selects a comparison expression (e.g., greater than, less than, greater than or equal to, less than or equal, equal to, not equal to, etc.) using the comparison selection mechanism 66b (e.g., through a drop-down menu). In some embodiments, the logic application 20 is configured to tailor the options available through the comparison selection mechanism 66b based on the data field selected by the user. For example, if the data field selected by the user is a data type that makes only particular comparison expressions applicable (e.g., text-based data fields may only be able to be compared using the "equal to" or the "not equal to" comparison expressions), the logical application 20 can list only these options through the comparison selection mechanism 66b.

After the user selects the data field and the comparison expression, the user enters a value (e.g., a number, text, etc.) using the user-entered-value selection mechanism 66c. In some embodiments, as shown in FIG. 6, the user-entered-value selection mechanism 66c includes an input box that allows the user to type in a value. In other embodiments, the user-entered-value selection mechanism 66c can provide the user with a list of available values, and the logic application 20 can tailor the available values based on the selected data field and/or the selected comparison expression. The logic application 20 compares the user-entered value with the selected data field as defined by the selected comparison expression. For example, as shown in FIG. 6, the user entered "500" in the user-entered-value selection mechanism 66c, selected the data field "Charged Amount," and selected the comparison expression "Is Greater Than."Therefore, the logical expression defined by the user for the flowchart step will determine if the "Charged Amount" "Is Greater Than" "500."

Figure 7:
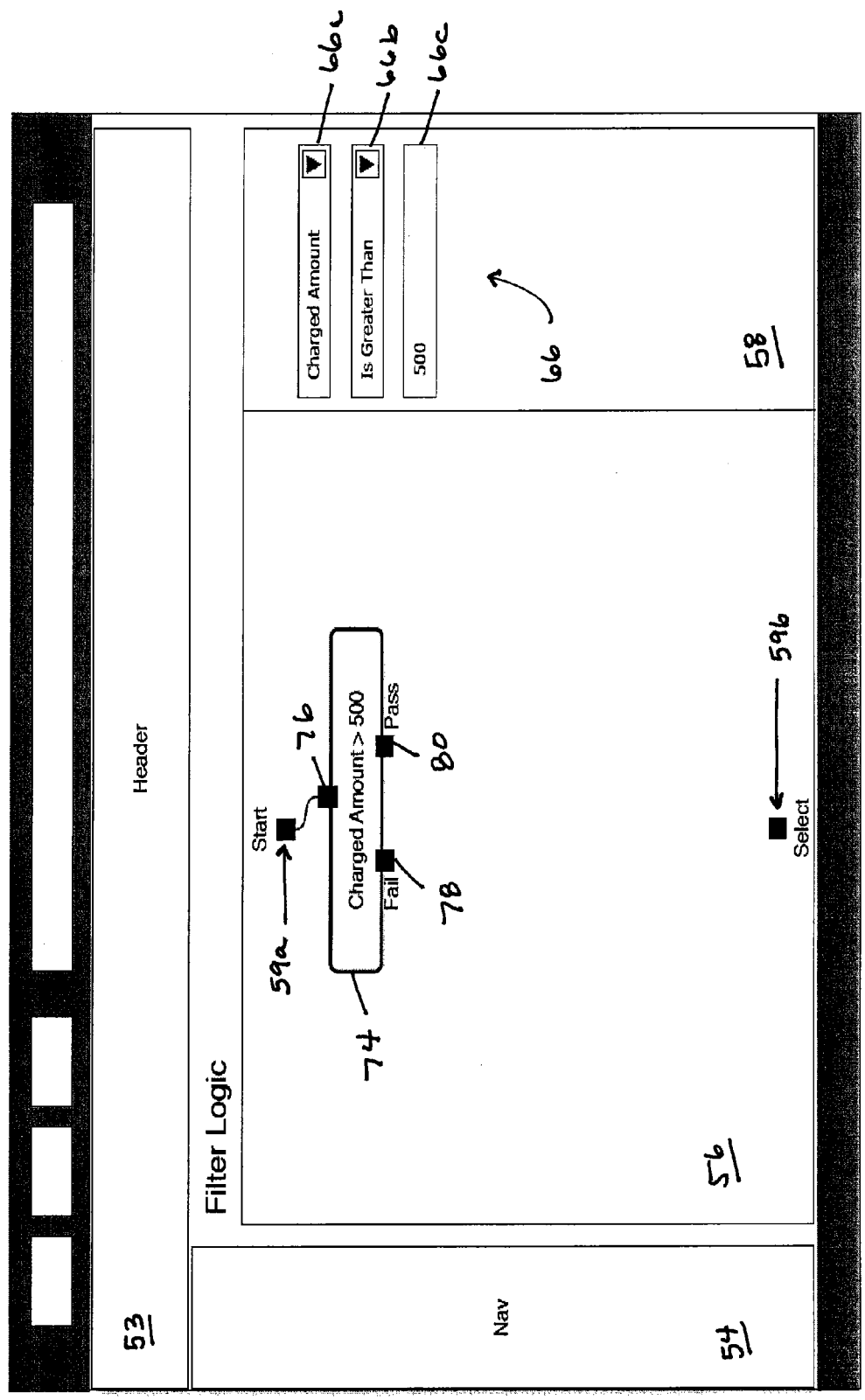

Returning to FIG. 3, after the user provides all of the selections for the expression options 66, the logic application 20 creates a graphical flowchart step based on the selections (at 68). The logic application 20 then displays the graphical flowchart step in the display section 56 (at 70). For example, FIG. 7 illustrates a page 72 of the user interface generated by the logic application 20 that displays a graphical step 74 representing the logical expression created by the user through the expression options 66 illustrated in FIG. 6. As shown in FIG. 7, the step 74 includes a description of the logical expression in a natural language (as opposed to a computer programming language, such as structured query language ("SQL")). By displaying the logical expression in an easy-to-read format, the user can follow and double-check the logic in the flowchart. In some embodiments, the logic application 20 displays the step 74 in the display section 56 as soon as the user selects one of the step type options 61. The logic application 20 then updates the step 74 as the user defines the logical expression for the step 74 using the expression options 66.

After the logic application 20 displays the step 74 in the display section 56, the user can move the step 74 to a desired location within the flowchart (at 75) (e.g., by clicking on and dragging the step 74 to a particular location). The user can also provide input and output connections for the step 74 (at 75). For example, as shown in FIG. 7, each step 74 includes one or more inputs 76. Each step 74 can also include one or more "fail" outputs 78 and one or more "pass" outputs 80. The user can connect the inputs 76 and the outputs 78 and 80 of a step 74 to other steps 74 or to the default nodes 59 displayed in the display section 56. In particular, the user can connect an input 76 of a step 74 to one or more outputs of other steps 74 or to the start node 59a. Similarly, the user can connect the outputs 78 and 80 of a step 74 to the inputs of one or more other steps 74 or to the select node 59b. As shown in FIG. 7, the logic application 20 can be configured to graphically display the connections provided by the user (as connecting lines between the steps 74) in the display section 56. As shown in FIG. 5, an end step 60 can include one or more inputs 76, but, because the end step 60 marks the end of a flowchart path, the end step 60 may not include any outputs.

In some embodiments, the logic application 20 is configured to place a new step 74 in a default position in the displayed flowchart. For example, as shown in FIG. 7, if the new step 74 is the first step of the flowchart, the logic application 20 can be configured to automatically place the new step 74 under the start node 59a and can automatically connect the input 76 of the new step 74 to the start node 59a. Similarly, if the flowchart includes existing steps 74, the logic application 20 can be configured to automatically place a new step 74 after the last-created step 74 and can also be configured to automatically connect the input 76 of the new step 74 to at least one of the outputs 78 or 80 of the last-created step 74.

As shown in FIG. 3, the above process can be repeated for each step 74 the user wants to add to the flowchart (at 82). In particular, after the user has placed a new step 74 in the display section 56 and provided connections for the step 74, the logic application 20 can display the step type options 61 the user (see FIG. 4). In other embodiments, the user can select a selection mechanism, such as a "done" button to indicate that the user has completed the current step 74 and is ready to add another step 74 (see FIG. 18).

Figure 8:
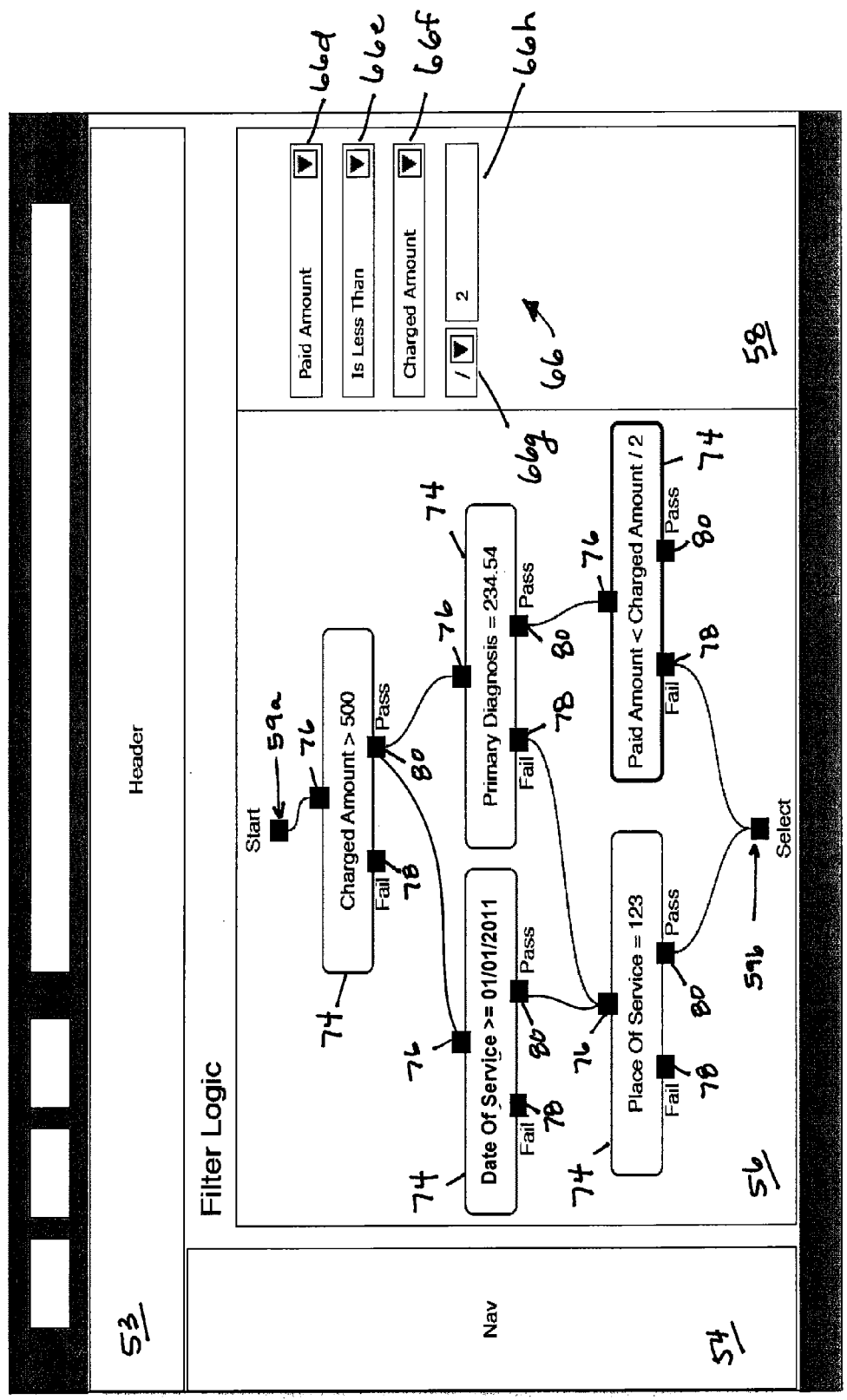

For example, FIG. 8 illustrates a page 84 of the user interface provided by the logic application 20 when the user indicates that he or she wants to add a field-comparison step type to the current flowchart. As shown in FIG. 8, the page 84 includes expression options 66 that include a first data-field selection mechanism 66d, a comparison selection mechanism 66e, a second data-field selection mechanism 66f, a mathematical expression selection mechanism 66g, and a user-entered-value selection mechanism 66h. As described, the user uses the data-field selection mechanisms 66d and 66f to select two data fields included in the data 22. After the user selects one or both of the data fields, the user selects a comparison expression (e.g., greater than, less than, greater than or equal to, less than or equal, equal to, not equal to, etc.) using the comparison selection mechanism 66e. Optionally, the user can also modify the second data field using the mathematical-expression selection mechanism 66g and the user-entered-value selection mechanism 66h. In particular, the user can specify a mathematical algorithm and a numerical value to apply to the second data field before comparing the second data field to the first data field. For example, as illustrated in FIG. 8, the user can divide the data field "Charged Amount" by 2 before comparing the data field to the data field "Paid Amount." If the user does not want to modify the second data field, the user can leave the mathematical-expression selection mechanism 66g and the user-entered-value selection mechanism 66h blank. After the user selects all of the options for the field-comparison step, the logic application 20 displays the step 74 in the display section 56 and the user can move the step 74 to a desired location and provides connections for the step 74 as described above.

It should be understood that the other step types can be associated with similar expression options 66. For example, the aggregator-value-comparison step type can be associated with an aggregation selection mechanism (allowing the user to select from an aggregating mathematical function, such as minimum, maximum, summation, or average), a data-field selection mechanism, and a user-entered-value selection mechanism. Similarly, the aggregator-value-comparison step type can be associated with an aggregation selection mechanism and two data-field selection mechanisms. The related-record step type can be associated with one or more relationship selection mechanisms (e.g., first, last, greatest, smallest, etc.) and one or more data-field selection mechanisms. In addition, the sub-filter step type can be associated with a flowchart selection mechanism that allows the user to select a flowchart previously created with the logic application 20. Similarly, the end step types can be associated with a user-entered-value selection mechanism that allows the user to enter a description or reason for the end step 60.

Figure 9:
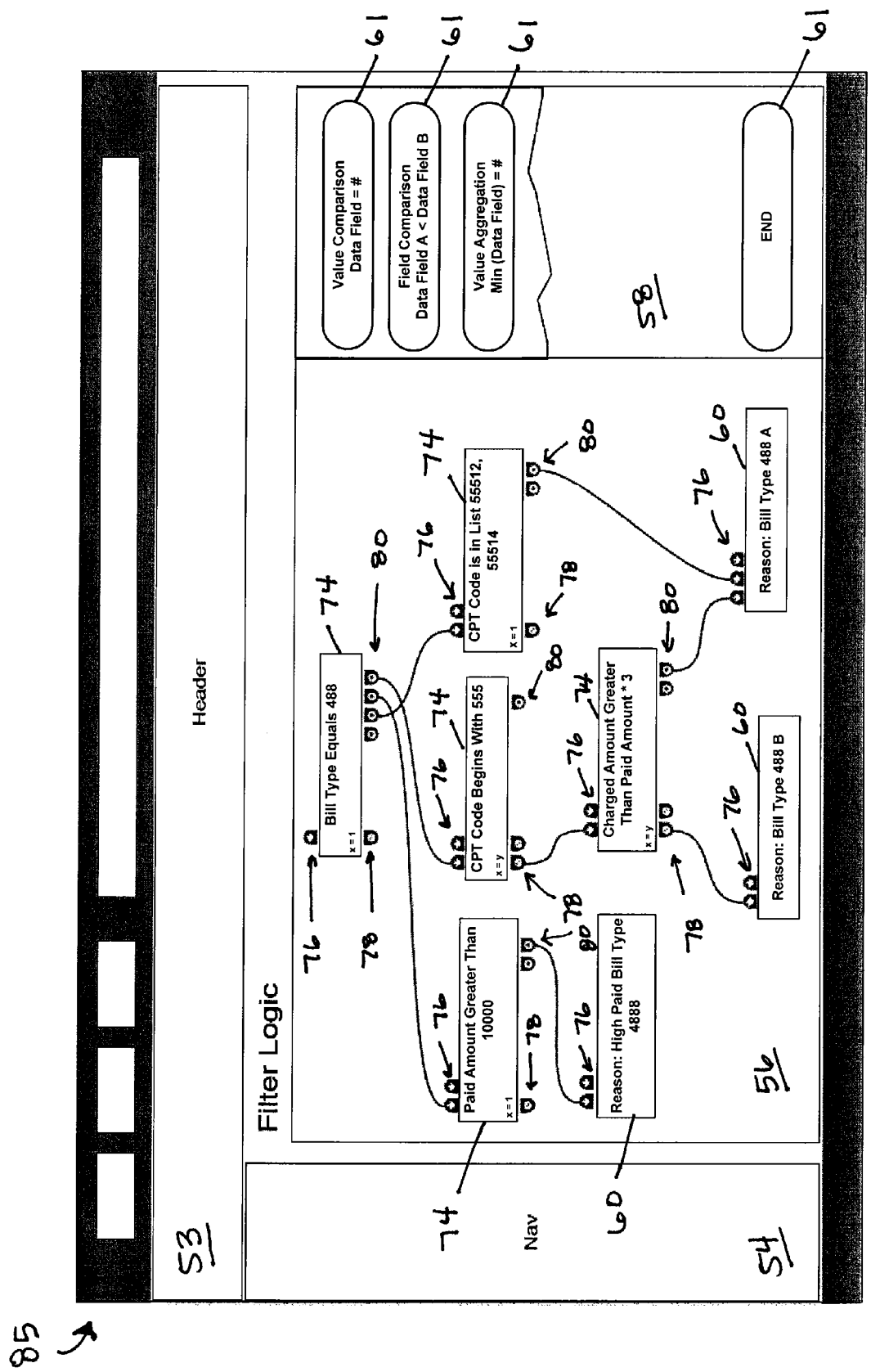

As noted above, an output 78 or 80 of a step 74 can be connected to a plurality of other steps 74 through a plurality of "pass" connections and/or through a plurality of "fail" connections. For example, FIG. 9 illustrates a page 85 that includes a flowchart where steps 74 are connected to multiple other steps 74. As shown in FIG. 9, the top step 74 is connected to three steps 74 by "pass" connections through the step's "pass" output 80. The ability to connect a step 74 to multiple other steps 74 along multiple "fail" connections and/or multiple "pass" connections allows the user to create complex and compact logic. In particular, without the ability to connect a step 74 to other steps 74 through multiple "fail" connections and/or multiple "pass" connections, the user would be required to create very long and complex flowcharts to express particular logic.

In some embodiments, the user can use the same page or a similar page he or she used to create a step 74 to edit the step 74. For example, if a user clicks on a step 74 displayed in the display section 56, the logic application 20 can display the expression options 66 associated with the selected step 74. The user can then modify the expression options selections for the step 74 as necessary. As shown in FIG. 8, in some embodiments, the logic application 20 highlights the step 74 selected by the user (e.g., by placing a thicker border around the step 74), so that the user know what step 74 will be modified if the user changes the logical expression through the displayed expression options 66.

Returning to FIG. 3, after the user creates all of the desired steps 74, the user can select a "run" or "execute" button displayed on a page of the user interface generated by the logic application 20. When the user selects this button, logic application 20 can convert the graphical flowchart to a database query for the data 22 (e.g., a SQL statement) (at 86). In particular, the logic application 20 can trace the paths of the graphical flowchart displayed in the display section 56 and can translate the paths into a series of database query statements based on the logical expression associated with each step 74 and the connections between each step 74.

For example, the logic application 20 can translate the logical expression associated with each step 74 to a proper database query statement. This can include generating a statement that includes the full data field name, as opposed to the natural language description, for each field name referenced in a step 74. For example, although a step 74 may reference a database field named "Bill Type," the proper database field name may be "bill_type." Similarly, the logic application 20 can convert the comparison or relationship expression specified by the user for a particular step 74 (e.g., "Greater Than," "Less Than," "Equals," "Begins With," "Is In," etc.) to a database query language expression or function (e.g., ">," "<," "=," "LIKE," "IN," etc.). For example, if a step 74 is associated with the logical expression "Bill Type Equals 488," the logic application 20 can generate a SQL statement of "bill_type='488.'"

Figure 10:
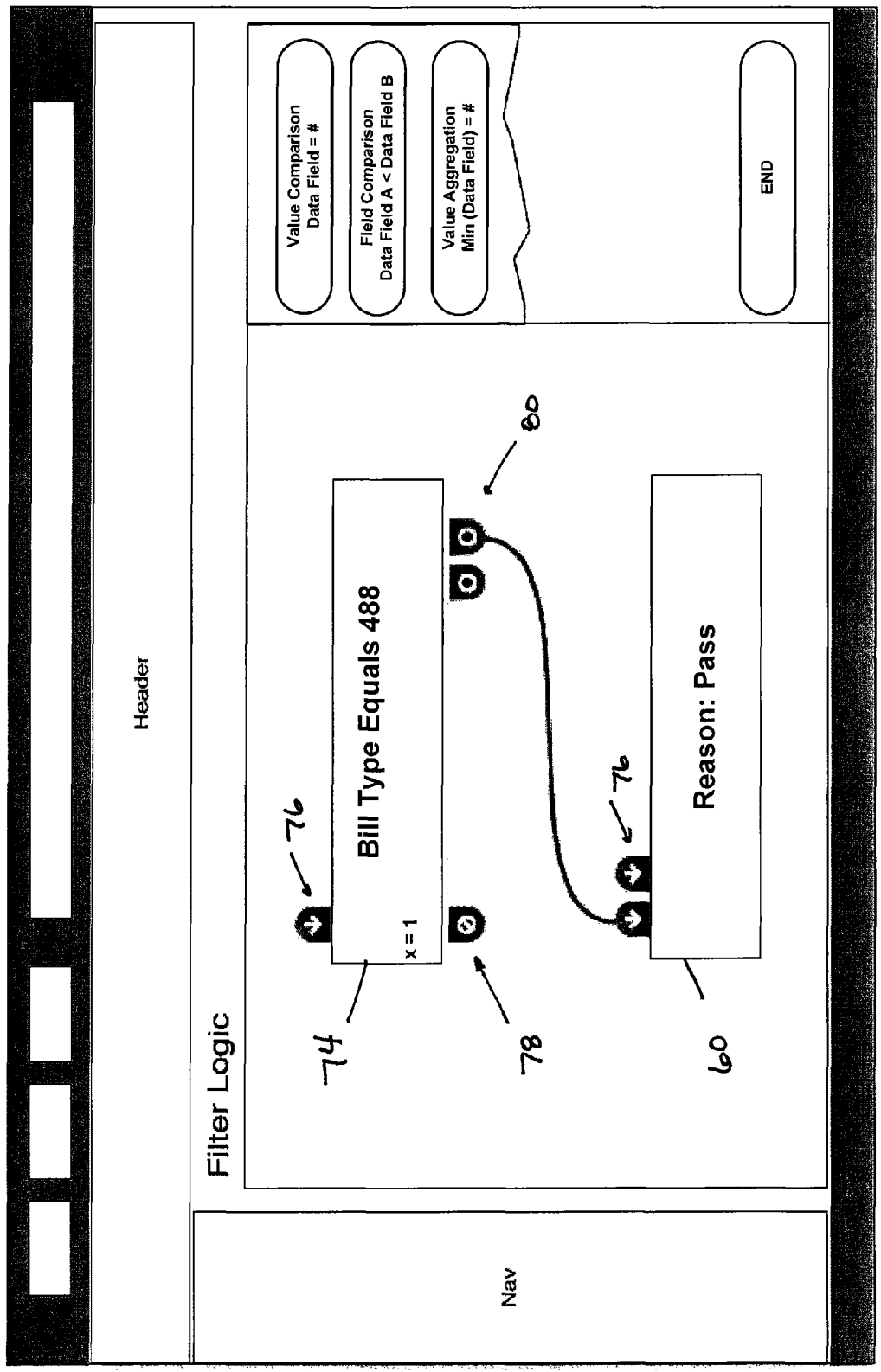
Figure 11:
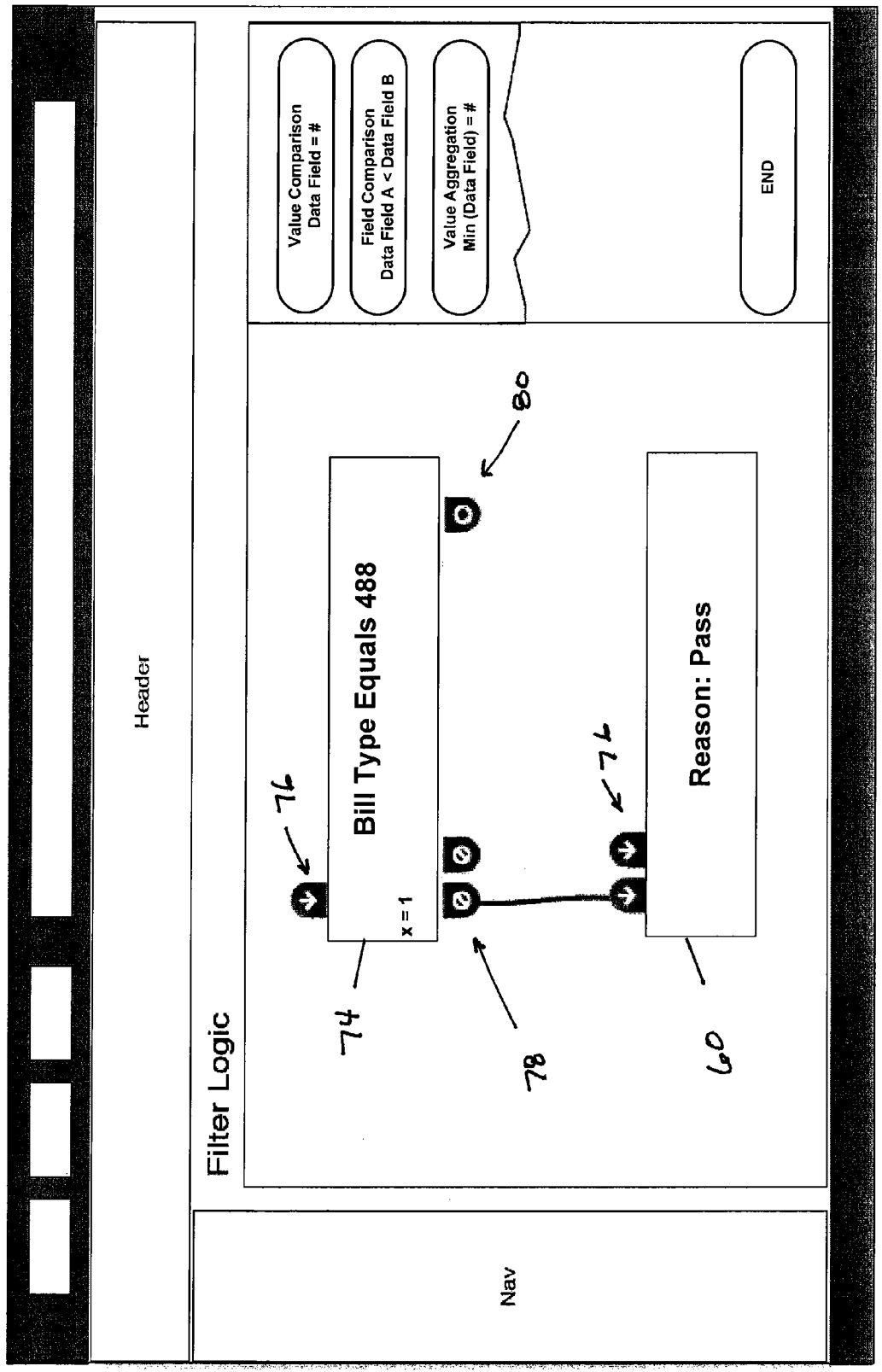
Figure 12:
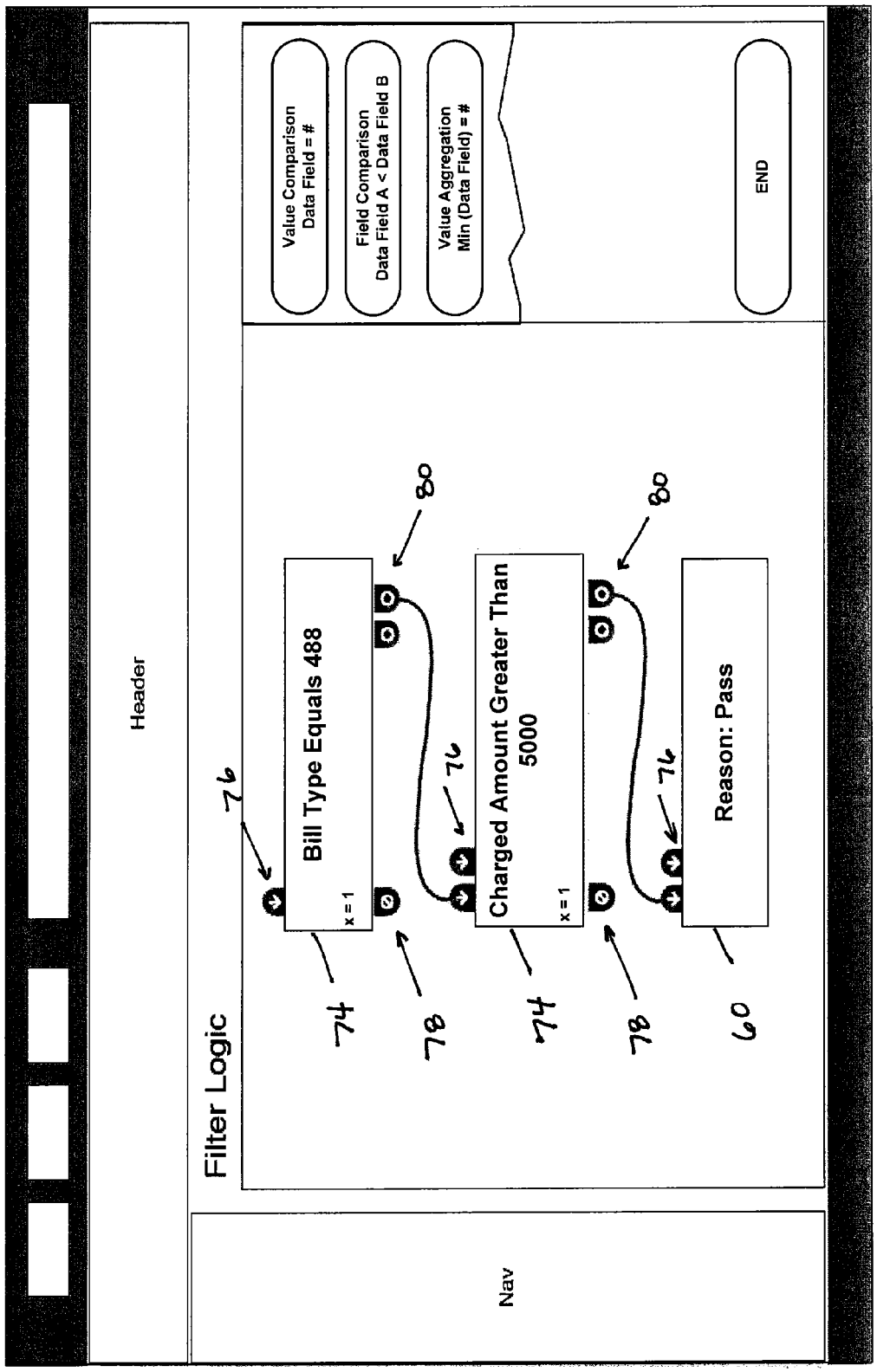
Figure 13:
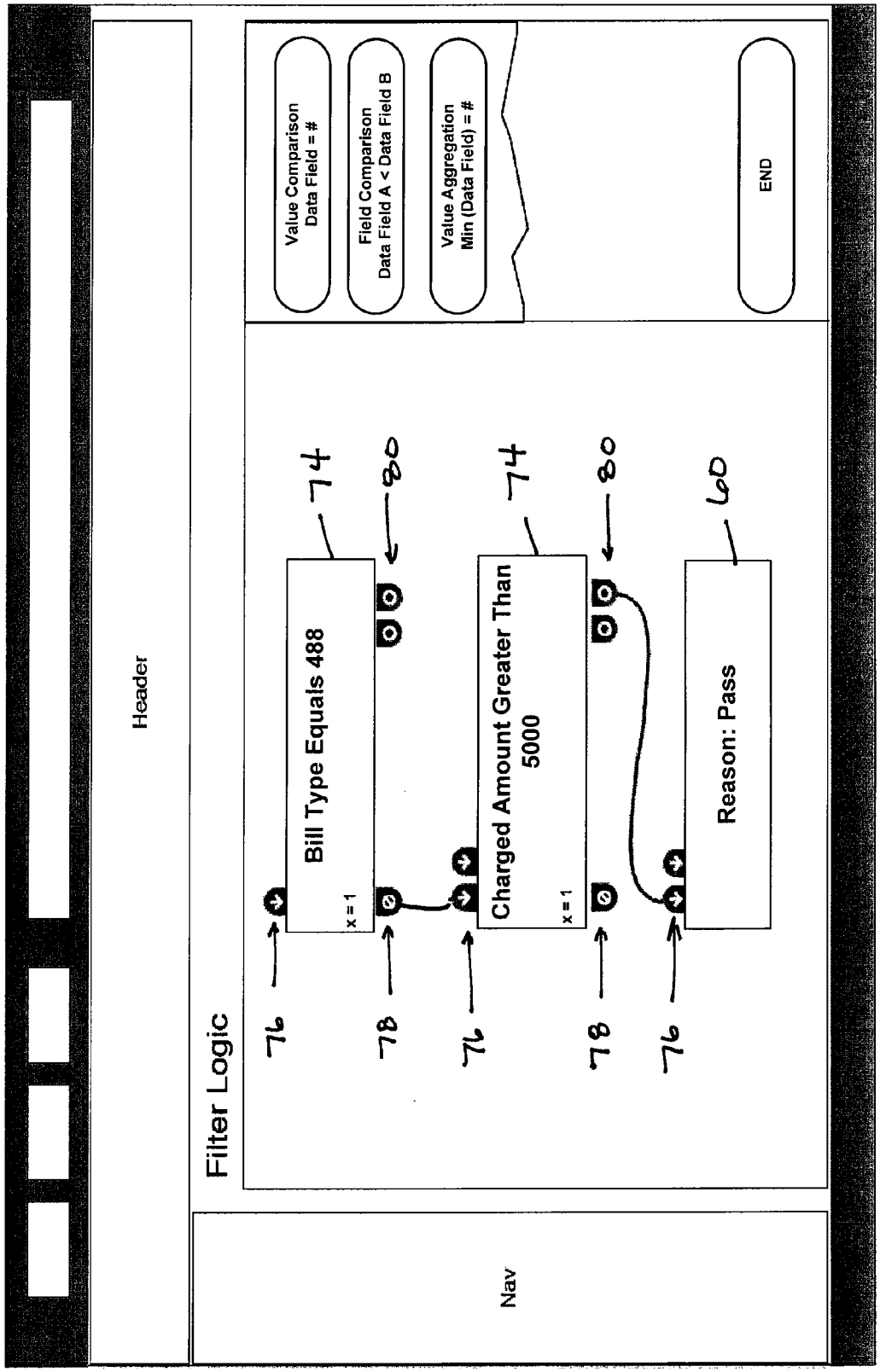
Figure 14:
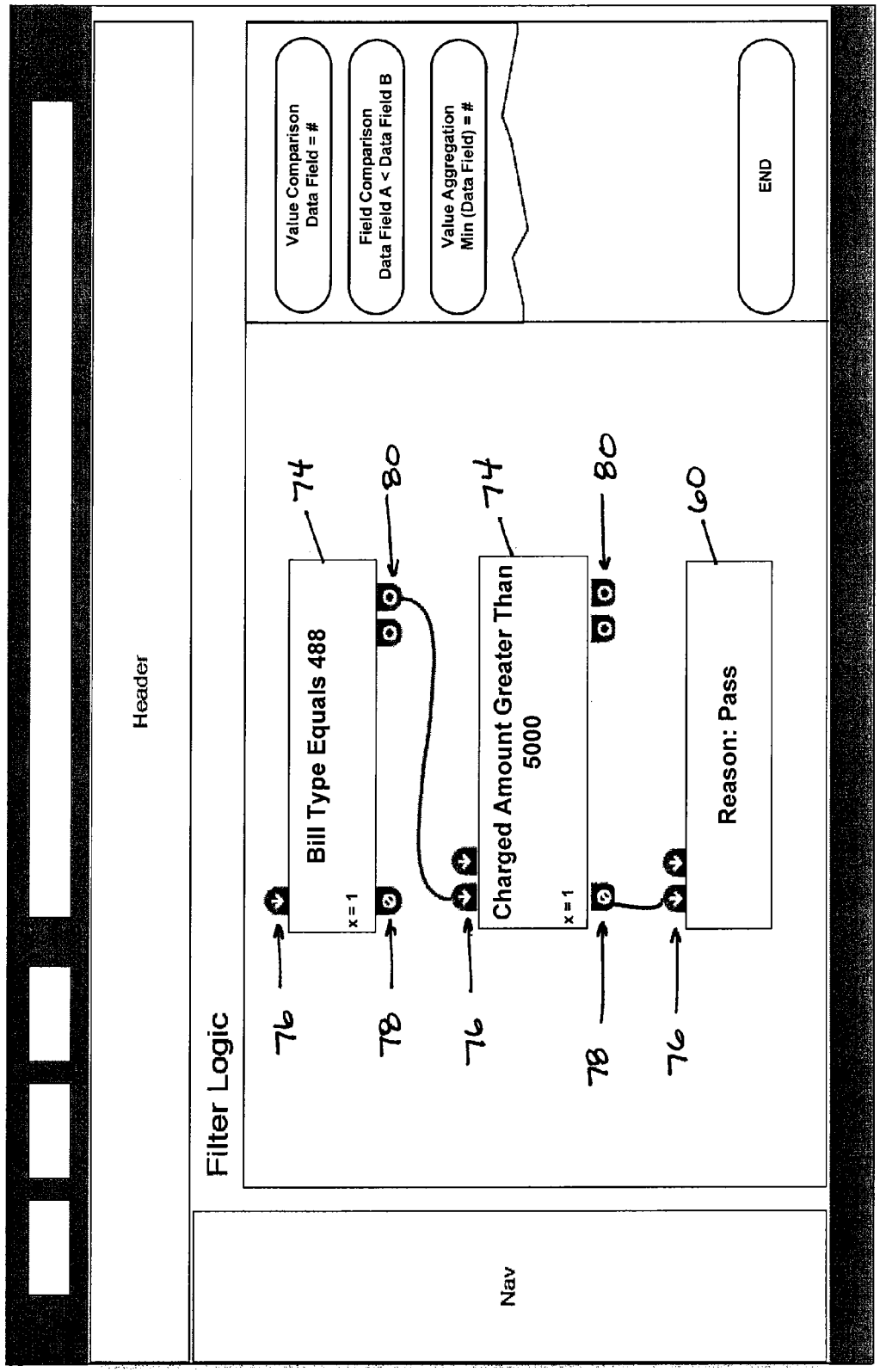
Figure 15:
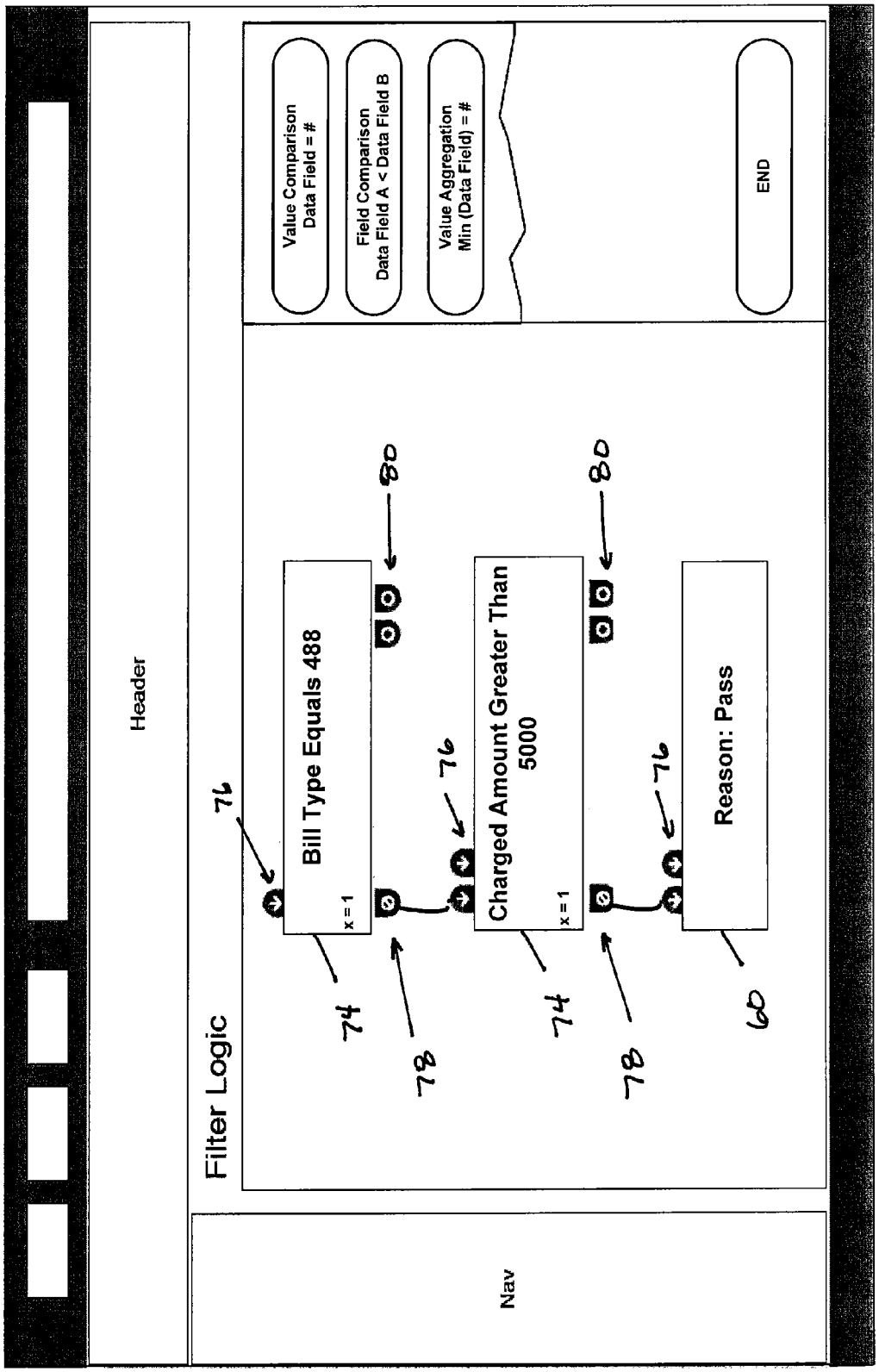

The logic application 20 also creates the database query statements for a flowchart step 74 based on the step's connections. For example, FIG. 10 illustrates a sample flowchart path created by a user through the logic application 20. The sample flowchart path includes a step 74 and an end step 60 connected by a "pass" connection (i.e., the "pass" output 80 of the step 74 is connected to the input 76 of the end step 60). For the flowchart path illustrated in FIG. 10, the logic application 20 creates an SQL statement of "bill_type='488.'" On the other hand, FIG. 11 illustrates a sample flowchart path including a step 74 connected to an end step 60 by a "fail" connection (i.e., the "fail" output 78 of the step 74 is connected to the input 76 of the end step 60). For the flowchart illustrated in FIG. 11, the logic application 20 creates an SQL statement of "NOT (bill_type='488')." Therefore, if a step 74 includes a "fail" connection, the logical expression associated with the step 74 along a path that includes the "fail" connection is negated.

If a flowchart path includes multiple steps 74, the logic application 20 uses the process defined above to generate a database query statement for each step 74 and connects the statements for each step 74 with a Boolean "AND." For example, FIGS. 12-15 illustrate sample flowchart paths that include multiple steps 74. For the flowchart path illustrated in FIG. 12, the logic application 20 creates a SQL statement of "charged_amount>5000 AND bill_type='488.'" For the flowchart path illustrated in FIG. 13, the logic application 20 creates a SQL statement of "charged amount>5000 AND NOT bill_type='488.'" Likewise, for the flowchart paths illustrated in FIGS. 14 and 15, the logic application 20 creates SQL statements of "NOT charged_amount>5000 AND bill_type='488'" and "NOT charged_amount>5000 AND NOT bill_type='488,'" respectively.

Figure 16:
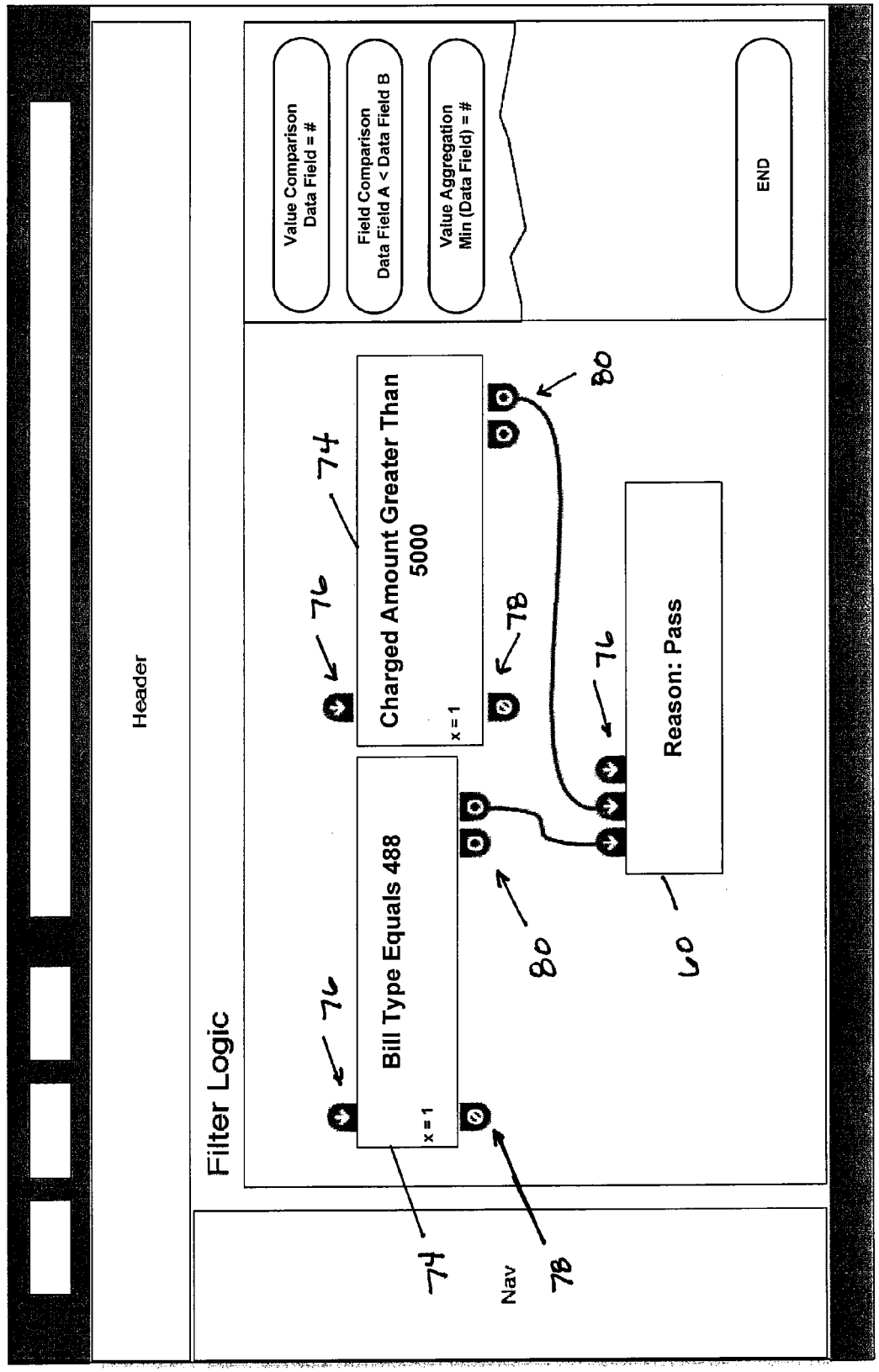

After the logic application 20 generates a database query statement for each path through the flowchart, the logic application 20 combines the statements associated with each path of the flowchart with a Boolean "OR." For example, FIG. 16 illustrates a sample flowchart including two flowchart paths. The first flowchart path is defined by the step 74 labeled "Bill Type Equals 488" and the end step 60. The second flowchart path is defined by the step 74 labeled "Charged Amount Greater Than 500" and the end step 60. As described above, the logic application 20 creates SQL statements for these paths of "bill_type='488'" and "charged_amount>5000," respectively. The logic application 20 then combines the statements for each path with a Boolean "OR" to create the SQL statement "bill_type='488' OR charged_amount>5000."

Figure 17:
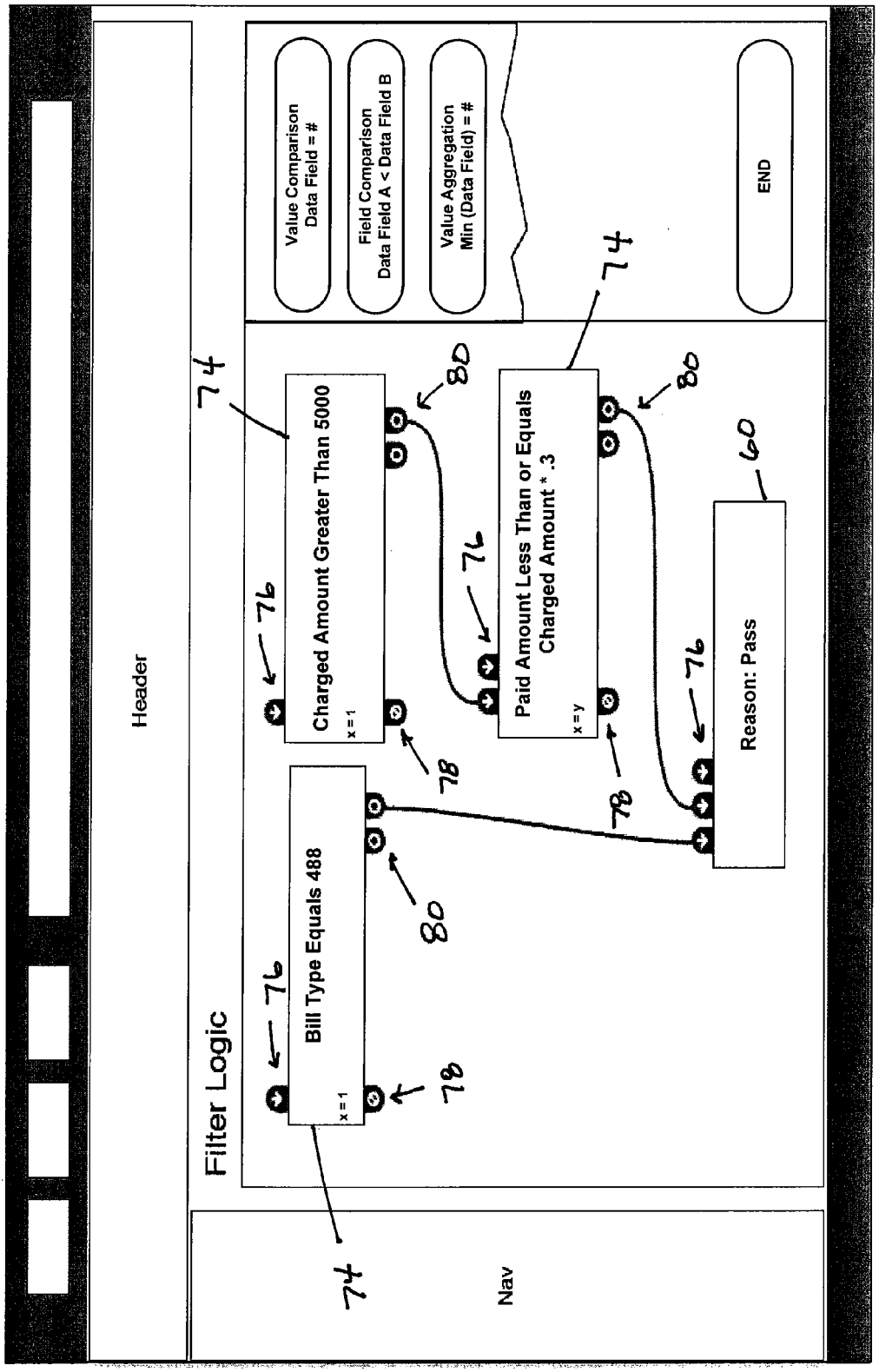

The logic application 20 also automatically overrides any default order of operations needed to maintain the sequence of steps defined by the structure of the flowchart. For example, FIG. 17 illustrates a sample flowchart including two flowchart paths. The first flowchart path starts with the step 74 labeled "Bill Type Equals 488" and the second flowchart path starts with the step 74 labeled "Charged Amount Greater Than 5000." As described above, the first flowchart path is associated with the SQL statement "bill_type='488'" and the second flowchart path is associated with the SQL statement "paid_amount<=charged_amount*0.3 AND charged_amount>5000." Therefore, the SQL statement for the entire flowchart is "bill_type='488' OR paid_amount<=charged_amount*0.3 AND charged_amount>5000." However, depending on the default order of operations for the database query language, this SQL statement may not yield the results desired by the user based on the structure of flowchart. Therefore, the logic application 20 can automatically override the order of operations by grouping the combined statements to yield the proper results. For example, the logic application 20 can create a SQL statement for the flowchart of "bill_type='488' OR (paid_amount<=charged_amount*3 AND charged_amount>5000)" to preserve the order of operations set forth by the sequence of steps 74 in the flowchart.

Similarly, the logic application 20 creates the following SQL statement for the flowchart illustrated in FIG. 9 that includes multiple paths and multiple end steps 60:

(paid_amount>10000 AND bill_type='488')

OR (NOT (charged_amount>paid_amount*3) AND NOT (cpt_code LIKE '555%') AND bill_type='488')

OR ((charged_amount>paid_amount*3 AND NOT (cpt_code LIKE '555%') AND bill_type='488') OR (cpt_code IN ('55512,' '55514') AND bill_type='488'))

It should be understood that the parentheses illustrated in the above sample SQL statements are used to mark an order of operations or logical groupings. However, the logic application 20 may be configured to include additional parentheses in generated database query statements for ease of implementation.

After the logic application 20 generates the database query, the logic application 20 can optionally display the query to the user so that the user can edit the query, copy the query to other data mining applications, combine the query with additional statements, or simply educate themselves on the format of the query. The logic application 20 can also be configured to execute the database query to retrieve the data 22 or a portion thereof (at 88). The logic application 20 can output the retrieved results in various forms, such as by displaying the results on a display, outputting the results to a printer, emailing the results to the user, exporting the results to a file, or importing the results to another software application, such as a report generation application.

The user can also save a created flowchart to computer-readable media and can reload the flowchart in the logic application 20 if the user wants to edit the logic represented by the flowchart or re-run the logic to retrieve new data. Also, as described above, a user can load a saved flowchart as a step 74 of a larger flowchart, which allows the user to build large, complex flowcharts using predefined sub-flowcharts.

Figure 18:
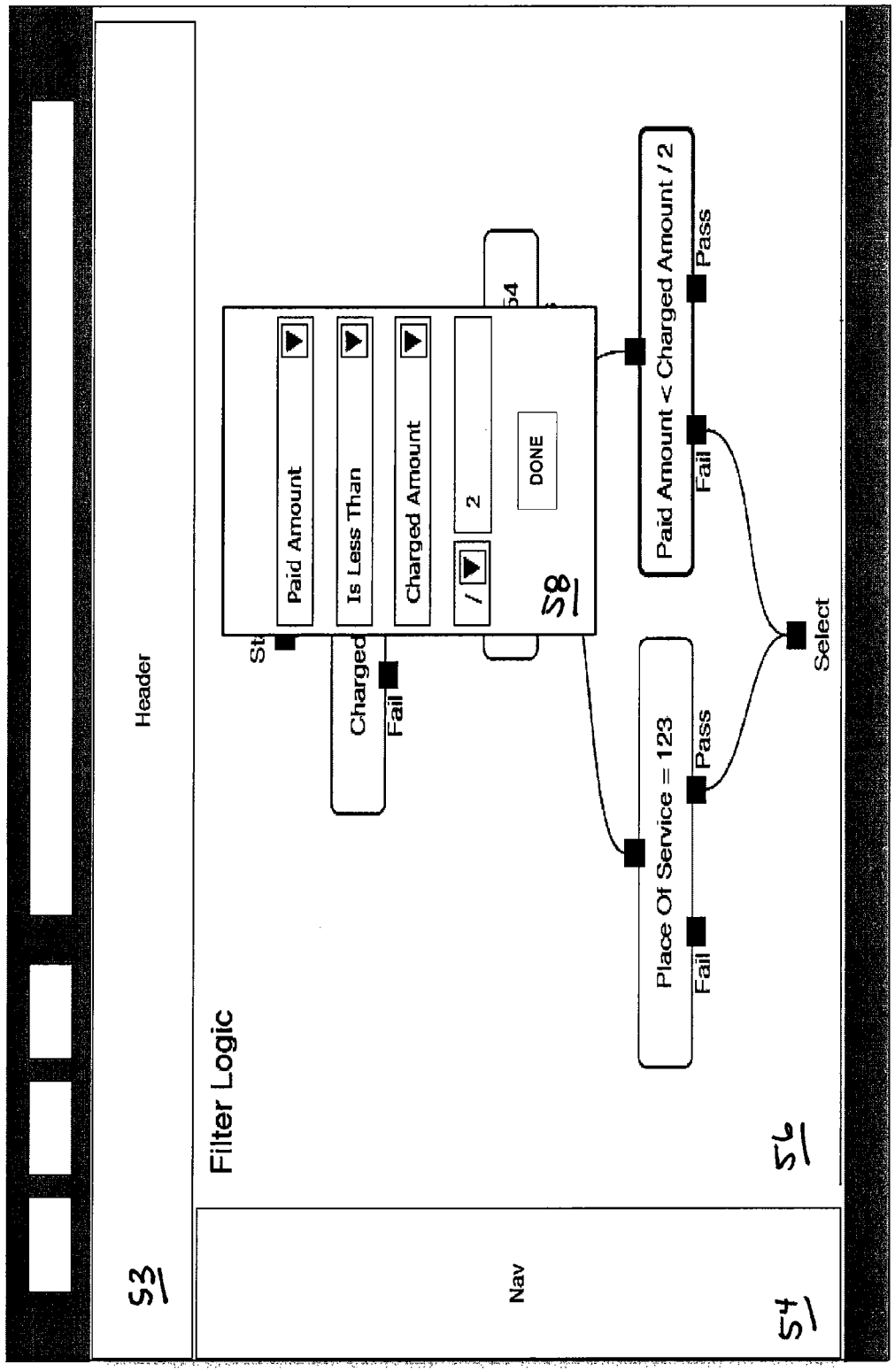

It should be understood that the layouts and configurations of the pages of the user interface included in the present application are provided as examples. The layouts of the pages can be varied and the functionality provided through each page can be distributed across multiple pages or combined with other pages. For example, as shown in FIG. 18, in some embodiments, the options section 58 is displayed on top of the display section 56. Furthermore, some of the sections of the pages can be optional, such as the navigation section 54.

Furthermore, it should be understood that the functionality performed by the logic application 20 can be distributed among multiple applications. For example, the logic application 20 may be configured to generate a database query based on the graphical flowchart and then may transfer the database query to a separate application that executes the query and outputs the results. Similarly, the logic application 20 may be configured to generate a database query and save the database query to computer-readable media. After the database query is saved, the user can open the database query with a separate application to view, edit, and/or execute the query.

Various features and advantages of the invention are set forth in the following claims.

What is claimed is:

1. A computer-implemented method for providing a user with a user interface for building a flowchart graphically representing a database query, the method comprising:
    presenting to the user, within the user interface, a plurality of flowchart step types, each of the plurality of flowchart step types associated with a different logical expression format;
    receiving, at a processor, a selection of one of the plurality of flowchart step types from the user;
    presenting to the user, within the user interface, at least one expression option for the logical expression format of the selected flowchart step type;
    receiving, at the processor, at least one input for the at least one expression option from the user;
    generating, at the processor, a graphical flowchart step associated with a logical expression, the logical expression based on the at least one input and the logical expression format of the selected flowchart step type;
    displaying to the user the graphical flowchart step within the user interface;
    receiving, at the processor, a plurality of input connections associated with the graphical flowchart step from the user;
    receiving, at the processor, a plurality of pass output connections associated with the graphical flowchart step from the user;
    receiving, at the processor, a plurality of fail output connections associated with the graphical flowchart step from the user; and
    automatically generating, at the processor, a database query corresponding to the logical expression, the plurality of input connections, the plurality of pass output connections, and the plurality of fail output connections associated with the displayed graphical flowchart step.

2. The method of claim 1, wherein generating the graphical flowchart step includes generating a graphical flowchart step including an input, a fail output, and a pass output.

3. The method of claim 2, wherein receiving the plurality of input connections from the user includes receiving a plurality of input connections from the user, wherein each of the plurality of input connections connects the input of the displayed graphical flowchart step to at least one of a fail output and a pass output of an additional graphical flowchart step.

4. The method of claim 2, wherein receiving, at the processor, the plurality of fail output connections from the user includes receiving a plurality of fail output connections from the user wherein each of the plurality of fail output connections connects the fail output of the displayed graphical flowchart step to an input of an additional graphical flowchart step.

5. The method of claim 2, wherein receiving, at the processor, the plurality of pass output connections from the user includes receiving a plurality of pass output connections from the user wherein each of the plurality of pass output connections connects the pass output of the displayed graphical flowchart step to an input of an additional graphical flowchart step.

6. The method of claim 1, further comprising graphically displaying to the user the plurality of input connections, the plurality of pass output connections, and the plurality of fail output connections within the user interface.

7. The method of claim 1, wherein receiving the at least one input for the at least one expression option includes receiving a reference to a flowchart graphically representing database query.

8. The method of claim 7, further comprising retrieving, at the processor, the flowchart from a data storage location using the reference.

9. The method of claim 1, further comprising generating, at the processor, a natural language description of the logical expression.

10. The method of claim 9, wherein displaying the graphical flowchart step includes displaying the flowchart step with the natural language description.

11. The method of claim 1, further comprising displaying the database query to the user within the user interface.

12. The method of claim 11, further comprising receiving edits to the displayed database query from the user.

13. The method of claim 1, further comprising automatically executing, at the processor, the database query to generate data results and presenting the data results to the user.

14. A system for providing a user with a user interface for building a flowchart graphically representing a database query, the system comprising:
  computer-readable media storing a logic application; and
  a processor configured to retrieve and execute the logic application
    to present the user with a plurality of flowchart step types, each of the plurality of flowchart step types associated with a different logical expression format;
    to receive a selection of one of the plurality of flowchart step types from the user;
    to present the user with at least one expression option for the logical expression format of the selected flowchart step type;
    to receive at least one input for the at least one expression option from the user;
    to generate a graphical flowchart step associated with a logical expression based on the at least one input;
    to display the graphical flowchart step to the user;
    to receive a plurality of input connections associated with the graphical flowchart step from the user;
    to receive a plurality of pass output connections associated with the graphical flowchart step from the user;
    to receive a plurality of fail output connections associated with the graphical flowchart step from the user; and
    to automatically generate a database query corresponding to the logical expression, the plurality of input connections, the plurality of pass output connections, and the plurality of fail output connects associated with the displayed graphical flowchart step.

15. The system of claim 14, wherein the graphical flowchart step includes an input, a fail output, and a pass output.

16. The system of claim 15, wherein each of the plurality of input connections connects the input of the displayed graphical flowchart step to at least one of a fail output and a pass output of an additional graphical flowchart step.

17. The system of claim 15, wherein each of the plurality of fail output connections connects the fail output of the displayed graphical flowchart step to an input of an additional graphical flowchart step.

18. The system of claim 15, wherein each of the plurality of pass output connections connects the pass output of the displayed graphical flowchart step to an input of an additional graphical flowchart step.

19. The system of claim 14, wherein the processor is further configured to execute the logic application to graphically display the plurality of input connections, the plurality of pass output connections, and the plurality of fail output connections to the user.

20. The system of claim 14, wherein the at least one input for the at least one expression option includes a reference to a flowchart graphically representing a database query generated using the logic application.

21. The system of claim 20, wherein the processor is further configured to execute the logic application to retrieve the flowchart from a data storage location using the reference.

22. The system of claim 14, wherein the processor is further configured to execute the logic application to generate a natural language description representing the logical expression.

23. The system of claim 22, wherein the processor is further configured to execute the logic application to display the natural language description with the graphical flowchart step.

* * * * *